United States Patent
Lei et al.

(10) Patent No.: US 11,157,467 B2
(45) Date of Patent: Oct. 26, 2021

(54) REDUCING RESPONSE TIME FOR QUERIES DIRECTED TO DOMAIN-SPECIFIC KNOWLEDGE GRAPH USING PROPERTY GRAPH SCHEMA OPTIMIZATION

(71) Applicant: INTERNATIONAL BUSINESS MACHINES CORPORATION, Armonk, NY (US)

(72) Inventors: Chuan Lei, Cupertino, CA (US); Abdul Quamar, San Jose, CA (US); Vasilis Efthymiou, San Jose, CA (US); Fatma Ozcan, San Jose, CA (US); Rana Alotaibi, La Jolla, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/800,392

(22) Filed: Feb. 25, 2020

(65) Prior Publication Data
US 2021/0263898 A1    Aug. 26, 2021

(51) Int. Cl.
*G06F 16/21* (2019.01)
*G06N 5/02* (2006.01)
(Continued)

(52) U.S. Cl.
CPC ........ *G06F 16/211* (2019.01); *G06F 16/2453* (2019.01); *G06F 16/9024* (2019.01); *G06N 5/02* (2013.01)

(58) Field of Classification Search
None
See application file for complete search history.

(56) References Cited

U.S. PATENT DOCUMENTS

| | | |
|---|---|---|
| 2017/0132329 A1 | 5/2017 | Yakout et al. |
| 2018/0052897 A1 | 2/2018 | Namarvar et al. |

(Continued)

FOREIGN PATENT DOCUMENTS

CN    109710701 A    5/2019

OTHER PUBLICATIONS

Agrawal, Sanjay et al. "Automated Selection of Materialized Views and Indexes for SQL Databases", Proceedings of the 26th International Conference on Very Large Databases, Cairo, Egypt, 2000; pp. 496-505.

(Continued)

*Primary Examiner* — Uyen T Le
(74) *Attorney, Agent, or Firm* — Cantor Colburn LLP; Anthony Curro

(57) ABSTRACT

According to one or more embodiments of the present invention, a computer-implemented method for providing a query response includes receiving, by a computing device, a domain-specific knowledge graph. The method further includes generating a first property graph schema, a property graph schema includes vertices, edges, and properties of the domain-specific knowledge graph, wherein the first property graph schema is generated based on an ontology of the domain-specific knowledge graph. The method further includes generating a second property graph schema from a copy of the first property graph schema that is optimized by applying one or more types of relationships in the first property graph schema. The method further includes instantiating a property graph using the second property graph schema. The method further includes receiving a query to obtain particular data from the domain-specific knowledge graph. The method further includes responding to the query using the property graph.

24 Claims, 18 Drawing Sheets

(51) Int. Cl.
*G06F 16/2453* (2019.01)
*G06F 16/901* (2019.01)

(56) References Cited

U.S. PATENT DOCUMENTS

| | | | | |
|---|---|---|---|---|
| 2018/0144053 | A1* | 5/2018 | Ankisettipalli | G06F 40/30 |
| 2018/0253653 | A1* | 9/2018 | Ozcan | G06N 20/00 |
| 2018/0349755 | A1 | 12/2018 | Gao et al. | |
| 2020/0242484 | A1* | 7/2020 | Lecue | G06N 5/022 |

OTHER PUBLICATIONS

Amazon "Amazon Neptune—Fast, Reliable Graph Database built for the cloud", retrieved at: https://aws.amazon.com/neptune/; Oct. 2018; 15 pgs.

Bollacker, Kurt et al. "Freebase: A Collaboratively Created Graph Database for Structuring Human Knowledge" retrieved from https://www.academia.edu/29111519/Freebase_A_Collaboratively_Created_Graph_Database_For_Structuring_Human_Knowledge; SIGMOD'08, Jun. 9-12, 2008, Vancouver, BC, Canada.ACM 978-1-60558-102-6/08/06; pp. 1247-1249.

Janusgraph "JanusGraph Distributed, open source, massively scalable graph database", retrieved at: https://janusgraph.org/; Oct. 2018; 3 pgs.

Kimura, Hideaki et al. "CORADD: Correlation Aware Database Designer for Materialized Views and Indexes" Proceedings of the VLDB Endowment, vol. 3, No. 1; Copyright 2010; pp. 1103-1113.

Lehmann, Jens et al. "DBpedia—A Large-scale, Multilingual Knowledge Base Extracted from Wikipedia", Semantic Web 1 (2012); pp. 1-29.

Mell, Peter et al. "The NIST Definition of Cloud Computing", National Institute of Standards and Technology, U.S. Department of Commerce, Special Publication 800-145; dated Sep. 2011; 7 pgs.

Microsoft Azure "Azure Cosmos DB—Globally distributed, multi-model database service for any scale", retrieved at: https://azure.microsoft.com/en-us/services/cosmos-db/; downloaded Nov. 26, 2019; 20 pgs.

Moir, Michael Joseph et al. "NoSE: Schema Design for NoSQL Applications", https://researchgate.net/publication/296485511; Conference Paper dated May 2016; 13 pgs.

NEO4J "Neo4j Graph Platform", https://neo4j.com; dated Oct. 2018; 10 pgs.

Quamar, Abdul et al. "Discovery and Creation of Rich Entities for Knowledge Bases" Abstract Only—Proceeding ExploreDB 2018 Proceedings of the 5th International Workshop on Exploratory Search in Databases and the Web; Article No. 4; Jun. 15-15, 2018; 2 pgs.

Sheth, Amit "Estimating the cardinality of RDF graph patterns", Conference Paper, Jan. 2007; retrieved at: https://www.researchgate.net/publication/221022266; WWW 2007, May 8-12, 2007, Banff, Alberta, Canada; ACM; pp. 1233-1234.

Suchanek, Fabian M. "YAGO: A Large Ontology from Wikipedia and WordNet", retrieved from: http://citeseerx.ist.psu.edu/viewdoc/summary?doi=10.1.1.455.1044; Max-Planck-Institute for Computer Science, dated Jul. 15, 2008; 21 pgs.

Sun, Wen et al. "SQLGraph: An Efficient Relational-Based Property Graph Store", retrieved at: https://research.google.com/pubs/archive/43287.pdf; SIGMOD'15, dated May 31-Jun. 4, 2015, Melbourne, Victoria, Australia; ACM 978-1-4503-2758-9/15/05; 15 pgs.

Tsialiamanis, Petros et al. "Heuristics-based Query Optimisation for SPARQL", retrieved at: www.planet-data.eu/sites/default/files/publications/heuristic_sparql_edbt2012.pdf; EDBT 2012, Mar. 26-30, 2012, Berlin, Germany; Copyright 2012 ACM 978-1-4503-0790-1/12/03; 12 pgs.

* cited by examiner

REDUCING RESPONSE TIME FOR QUERIES DIRECTED TO DOMAIN-SPECIFIC KNOWLEDGE GRAPH USING PROPERTY GRAPH SCHEMA OPTIMIZATION

BACKGROUND

The present invention relates generally to computer technology, and more particularly to optimize response time of queries directed to domain-specific knowledge graph.

Domain-specific knowledge graphs are used to derive insights in many enterprise applications such as customer engagement, fraud detection, network management, etc. Such knowledge graphs are often created by curating and integrating multiple data sources. Such knowledge graphs capture domain specialization by, typically, an ontology which provides a semantic abstraction to describe the entities and their relationships of the data in the knowledge graphs.

SUMMARY

According to one or more embodiments of the present invention, a computer-implemented method for providing a query response includes receiving, by a computing device, a domain-specific knowledge graph. The method further includes generating, by the computing device, a first property graph schema, a property graph schema includes vertices, edges, and properties of the domain-specific knowledge graph, wherein the first property graph schema is generated based on an ontology of the domain-specific knowledge graph. The method further includes generating, by the computing device, a second property graph schema from a copy of the first property graph schema that is optimized by applying one or more types of relationships in the first property graph schema. The method further includes instantiating, by the computing device, a property graph using the second property graph schema. The method further includes receiving, by the computing device, a query to obtain particular data from the domain-specific knowledge graph. The method further includes responding to the query using the property graph.

In one or more examples, optimizing the property graph schema includes receiving the storage space limit as an input, the storage space limit indicating an amount of storage space budgeted for optimizing the property graph schema. The optimization further includes determining the order of all relationships in the first property graph schema based on a cost-benefit model. The optimization further includes selecting a subset of relationships in the first property graph schema that maximize the total benefit until the storage space limit is exhausted.

In one or more examples, optimizing the property graph schema includes receiving the storage space limit as an input, the storage space limit indicating an amount of storage space budgeted for optimizing the property graph schema. The optimization further includes determining the order of all concepts in the first property graph schema based on the centrality analysis. The optimization further includes iterating through the concepts from high centrality score to lower and apply relationship rules to each concept until the storage space limit is exhausted.

In one or more examples, the property graph schema is optimized by modifying one or more inheritance relationships in the ontology. Alternatively, or in addition, the property graph schema is optimized by modifying one or more union relationships in the ontology. Alternatively, or in addition, the property graph schema is optimized by modifying one or more 1:1 relationships in the ontology. Alternatively, or in addition, the property graph schema is optimized by modifying one or more 1:M relationships in the ontology. Alternatively, or in addition, the property graph schema is optimized by modifying one or more M:N relationships in the ontology.

Further, in one or more examples, the property graph schema is optimized by modifying a subset of relationships from a plurality of relationships in the ontology, wherein the subset of relationships is determined based on a storage space limit.

Embodiments of the present invention improve response time to queries directed to a domain-specific knowledge graph. As described herein, technical solutions provided by embodiments of the present invention automatically generate a graph schema design that has significant impact on query performance. The technical solutions herein facilitate an ontology-driven approach for property graph schema design. The rich semantic relationships in an ontology contain a variety of opportunities to reduce edge traversals, which have significant impact on graph query performance. Technical solutions described herein exploit these opportunities to generate a property graph schema from the domain ontology. Empirical evaluation of the technical solutions described herein, with two real-world knowledge graphs have shown up to 100 times speed-up compared to existing technical solutions.

In one or more embodiments of the present invention, the features described above can be implemented as a system, a computer program product, an apparatus, a device, or any other practical application.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
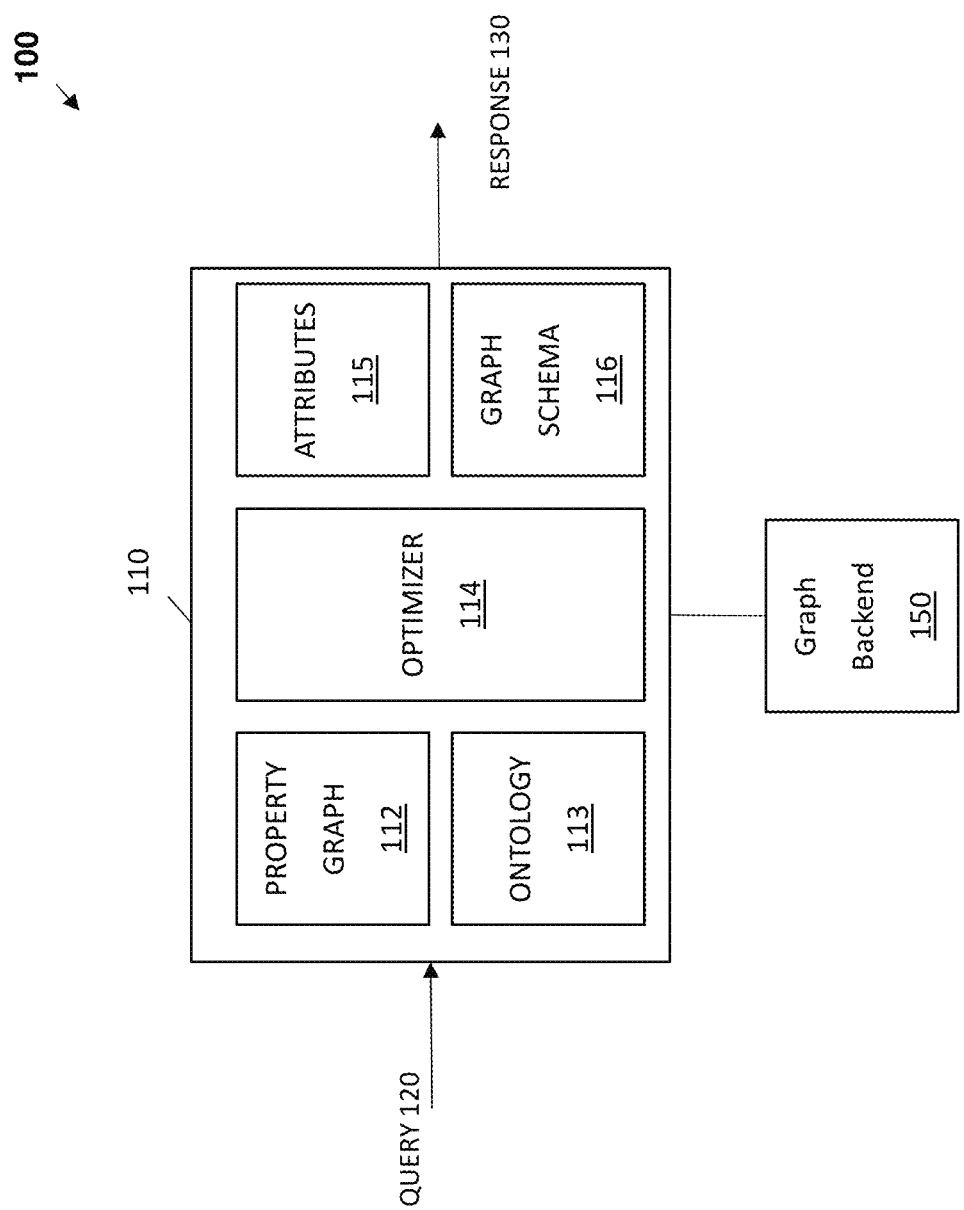
FIG. 1 depicts a block diagram of a query response system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

There are two approaches to querying knowledge graphs. The first uses resource description framework (RDF) data model and a query language, such as SPARQL. RDF is a family of World Wide Web Consortium (W3C®) specifications that were originally designed as a metadata data model. RDF is now used as a general method for conceptual description or modeling of information that is implemented in web resources, using a variety of syntax notations and data serialization formats. SPARQL is a query language developed by the W3C® specifically as a RDF query language—that is, a semantic query language for databases to be able to retrieve and manipulate data stored in RDF format.

The second approach to querying knowledge graphs uses property graph model and a query language, such as Gremlin. Gremlin is a graph traversal language and virtual machine developed by APACHE™ Software Foundation (ASF). As an explanatory analogy, Gremlin is to graph databases what the structured query language (SQL) is to relational databases.

A difference between RDF and property graphs is that RDF regularizes the graph representation as a set of triples, which means that even literals are represented as graph vertices. Such artificial vertices make it a technical challenge to express graph queries in a natural way, unlike the property graph model, in which vertices and edges can be associated with properties as key-value pairs. Accordingly, the use of property graphs based systems to respond to queries is on the rise.

Various existing techniques propose optimizing the query performance, system scalability, and transaction support for such property graph based query systems. However a technical challenge with such property graph based query systems is that of schema optimization in the property graph setting. An effect of such schema optimization has a practical application of improving (reducing) query response times, which is critical for high performance graph applications and queries, such as in financial enterprise systems, health enterprise systems, and other such mission critical systems.

The technical solutions provided by embodiments of the present invention address the technical challenges by facilitating an ontology-driven approach to optimize the property graph schema over domain-specific knowledge graphs. It should be noted that the terms property graph schema, graph schema, and schema can be used interchangeably.

FIG. 1 depicts a block diagram of a query response system according to one or more embodiments of the present invention. The depicted system 100 includes a database system 110 that receives a query 120 to provide a response 130. The response 130 is based on a property graph 112 stored in the database system 110. It should be noted that although the database system 110 is depicted by a single block, in one or more embodiments of the present invention, the database system 110 can be a distributed system that includes multiple components, such as computing devices, storage devices, and the like.

The property graph 112 can be any domain specific knowledge graph. For example, the property graph 112 can be a knowledge graph representing financial data records, health data records, biomedical data records, sports data records, webpage data records, or any other data records.

The query 120 is a request to access one or more data records or attributes about the data records that are represented by the property graph 112. The response 130 provides the requested data records and/or the requested attributes according to the query 120. The query 120 can be received from a human user and/or from another computing device that generates the query 120 automatically. The response 130 can be provided in a format that is suited either for human user consumption and/or machine consumption. For example, in case of the human user, the response 130 can be provided in a user-friendly manner via a user-interface that is configured to format the data in a readable manner, for example as tabulated data, a visual representation of the data (e.g. charts), and the like.

The database system 110 includes an optimizer 114. The optimizer 114 improves the time required for generating the response 130 for the received query 120. In one or more embodiments of the present invention, the optimizer 114 generates a property graph schema design 116 from an ontology 113 of the property graph 112 to optimize the performance of the query 112. In addition to the ontology 113, one or more embodiments of the present invention further takes one or more attributes 115 such as, space constraints, and additional information such as data distribution and workload summaries.

Figure 2:
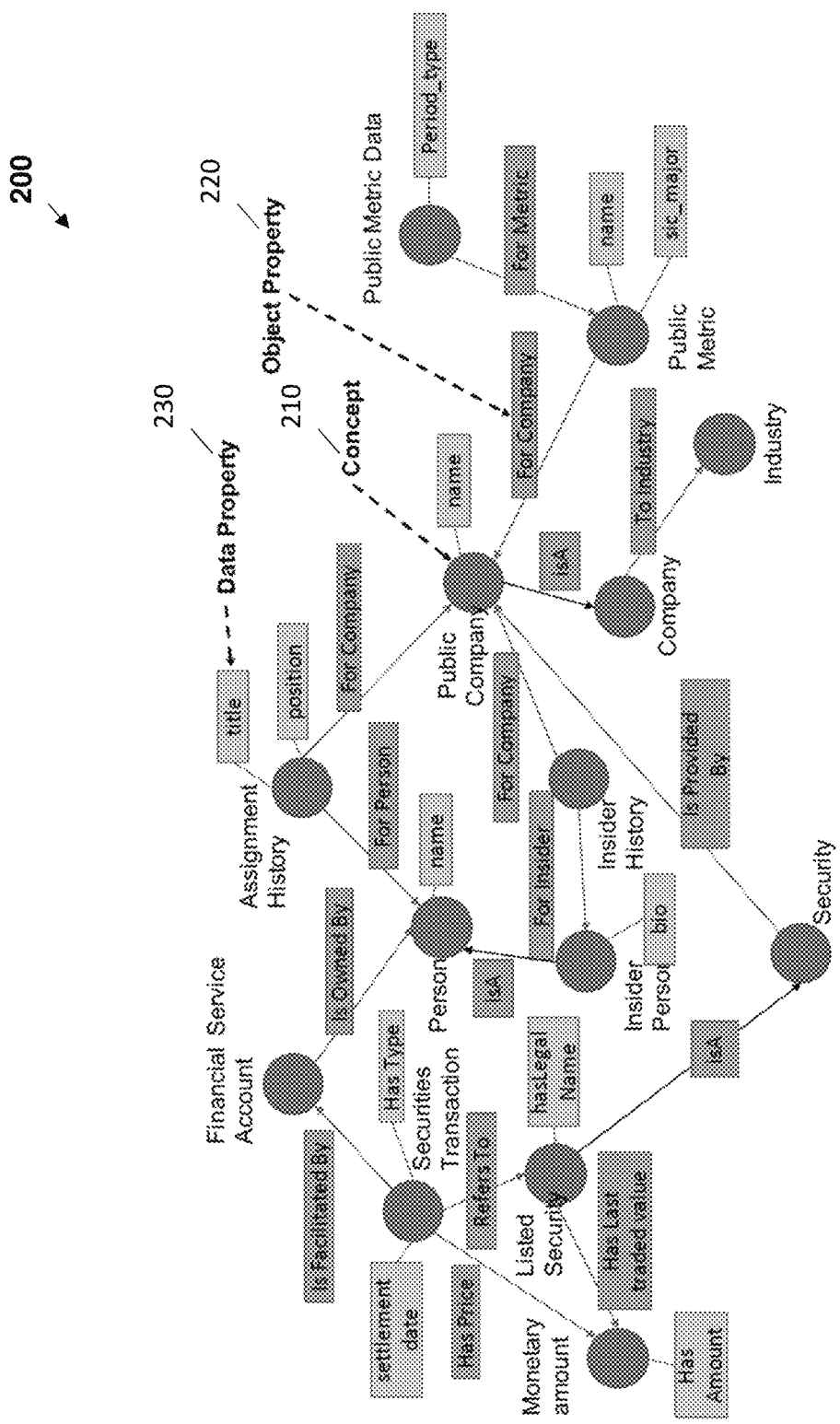
FIG. 2 depicts an example ontology according to one or more embodiments of the present invention.

FIG. 2 depicts an example ontology according to one or more embodiments of the present invention. It should be noted that although the depicted ontology 200 is an example portion from a financial ontology, in other embodiments of the present invention, the ontology 113 can be from any domain, such as health, drug discovery, genetic discovery, advertising, webpages, text recognition, or any other.

The ontology 113 describes a particular domain of the property graph 112 and provides a structured view on the data represented by the property graph 112. Specifically, the ontology 113 describes in detail one or more concepts that are relevant for that domain, one or more properties associated with the concepts, and one or more relationships across the different concepts. For example, the ontology 113 can capture a variety of relationships between concepts such as inheritance, union, etc. The ontology 113, accordingly, comprehensively describes the data model for a real world data set that is represented by the property graph 112.

The ontology 113 can be expressed as a triplet O (C, R, P), where C is a set of concepts $C=\{c_n|1 \leq n \leq N\}$, R is a set of relationships $R=\{r_k|1 \leq k \leq K\}$, and P is a set of properties $P=\{p_m|1 \leq m \leq M\}$. Here, N, K, and M are predetermined integers. Ontologies are stored or represented in electronic data structures for computing devices to operate on the ontologies using a predetermined format, such as Web Ontology Language (OWL). In computer programming languages, when using OWL, a concept is represented as a class 210, a property is associated with a concept and is typically referred to as a DataProperty 230. Further, a relationship between two concepts is referred to as an ObjectProperty 220. A class is a data structure that is used by a computing device, and, as used herein the terms concept and class can be interchangeably used.

Accordingly, each DataProperty 230 $p_i \in p_n$ represents a characteristic of a concept 210 $c_n \in C$ and $P_n \subseteq P$ represents the set of DataProperties associated with the concept $c_n$. For simplicity, the notation $c_n/P_1$ represents properties $P_1$ belonging to the concept $c_n$. Each ObjectProperty 220 $r_k=(c_s, c_d, t)$ is associated with a source concept 210 $c_s \in C$, also referred to as the domain of the ObjectProperty 220, a destination concept 210 $c_d \in C$, also referred to as the range of the ObjectProperty 220, and a type t. The type t can be either a function (i.e., 1:1 and 1:M), M:N, an inheritance relationship (also called a is-A relationship) or a union/membership relationship.

For example, the depicted ontology 200 in FIG. 2 includes concepts 210 such as Company, Public Company, Person, Assignment History, Industry, Public Metric, and a variety of relationships such as functional and inheritance. Each of these concepts 210 is associated with a set of data properties 230 and the object properties 220 are labeled to show associations between the concepts 210.

As used herein, a property graph PG (V, E) is a labeled graph with vertex set V and edge set E, where each node $v \in V$ and each edge $e \in E$ has a property list that includes multiple attribute-value pairs, and each edge $e \in E$ represents a relationship between two vertices. In contrast to ontologies, a property graph contains all instance data.

Further, as used herein, a property graph schema PGS (VS, ES, PS) is defined as a directed, vertex-labeled (VS), edge-labeled (ES) multi-graph with self-edges, where edges have their own identity. Each vertex schema $vs \in VS$ and each edge schema $es \in ES$ has a property list specified in PS. Similar to a relational database schema that describes tables, columns, and relationships of a relational database, the property graph schema describes vertices, edges, and properties of a property graph. In other words, a property graph is an instance of a property graph schema. Table 1 provides notations that are used herein.

TABLE 1

Notation.

| Notations | Definitions |
|---|---|
| $O$ | an ontology |
| $c_i$ | $c_i \in C$: a concept in an ontology |
| $r_i$ | $r_i \in R$: a relationship in an ontology |
| $c_i.P_i$ | all data properties associated to $c_i$ |
| $c_i.\text{inE}$ | all incoming relationships of $c_i$ |
| $c_i.\text{outE}$ | all outgoing relationships of $c_i$ |
| $c_i.R_i$ | $c_i.R_i = c_i.\text{inE} \cup c_i.\text{outE}$, all relationships of $c_i$ |
| $r_i.\text{src}$ | the source concept of the relationship $r_i$ |
| $r_i.\text{dst}$ | the destination concept of the relationship $r_i$ |
| $r_i.\text{type}$ | the relationship type of $r_i$ (i.e., 1:1, union, inheritence, 1:M, and M:N) |
| $\mathcal{PGS}$ | a property graph schema |
| $vs_i$ | $vs_i \in VS$: a vertex schema |
| $vs_i.PS_i$ | all property schema of $vs_i$ |
| $vs_i.E_i$ | $vs_i.E_i = vs_i.\text{inE} \cup vs_i.\text{outE}$, all edges of $vs_i$ |
| $es_i.\text{src}$ | the source vertex of the edge $es_i$ |
| $es_i.\text{dst}$ | the destination vertex of the edge $es_i$ |
| ps.type | the data type of ps (e.g., INT, STRING, LIST) |
| $\mathcal{PG}$ | a property graph |
| $V_i$ | $V_i \in V$ all instance vertices of $VS_i \in VS$ |
| $v_{i,j}$ | $v_{i,j} \in V_i$, an instance vertex of $VS_i \in VS$ |
| $v_{i,j}.p_k$ | a property of $v_{i,j}$ |
| $e_k$ | $e_k = (v_{src}, v_{dst}) \in E, v_{src}, v_{dst} \in V$ |

The optimizer 114 uses a set of rules that are designed to optimize the query performance with respect to different types of relationships in the ontology 113. In case there is a space constraint, one or more embodiments of the present invention estimate the cost-benefit of applying these rules to each individual relationship by leveraging the additional data distribution and workload information. As described herein, embodiments of the present invention can operate using either a relation-centric approach or a concept-centric. The optimizer 114 incorporates cost-benefit scores to generate the property graph schema 116 using the ontology 113. In one or more examples, the optimizer 114 generates a first property graph schema from the ontology 113 and then generates an optimized version of the first property graph schema (i.e., a second property graph schema) using one or more rules described herein, where each rule optimizes a respective type of relationship in the first property graph schema.

The technical problem that the optimizer 114 solves can be stated as: given an ontology create a property graph schema such that the corresponding property graph can efficiently support various types of graph queries. As noted earlier, in knowledge graph applications, there is typically a space constraint on the graph size due to monetary cost. Embodiments of the present invention incorporate the space constraint and to utilize additional information such as data distribution and workload summary to produce a property graph schema accordingly. The technical solutions provided by embodiments of the present invention facilitate to identify the distinct opportunities from the given ontology and exploit these opportunities to efficiently translate the ontology into a property graph schema.

Accordingly, embodiments of the present invention facilitate formulating property graph schema design for knowledge graphs using an ontology-driven approach. In one or more embodiments of the present invention, performance of a query on a property graph is improved by a set of rules that reduce edge traversals of the property graph by exploiting semantic relationships in the ontology. The generation of the property graph schema is described using various techniques that facilitate defining a metric to choose the schema with better predicted performance.

The optimizer 114 operates as a property graph schema generator. The optimizer 114 takes, as inputs, the ontology 113 and the attributes 115 (e.g. data statistics, workload summaries, a space constraint) to produce the property graph schema 116. The schema 116 describes vertices, edges, and properties of the property graph 112. In one or more embodiments of the present invention, the property graph 112 is instantiated on a graph backend 150 (e.g., JanusGraph or Neo4j®). At query time, a user directly issues graph queries 120, for example, in Gremlin, against the instantiated property graph 112.

Graph queries 120 can involve multi-hop traversal or vertex attribute lookup/analytics on the same property graph 112. Edge traversals over a graph are vital to the overall query performance. Hence, embodiments of the present invention optimize the rich semantic relationships in the ontology 113 and uses a set of rules for different types of relationships to use opportunities for minimizing edge traversals and consequently improve graph query performance.

Figure 3:
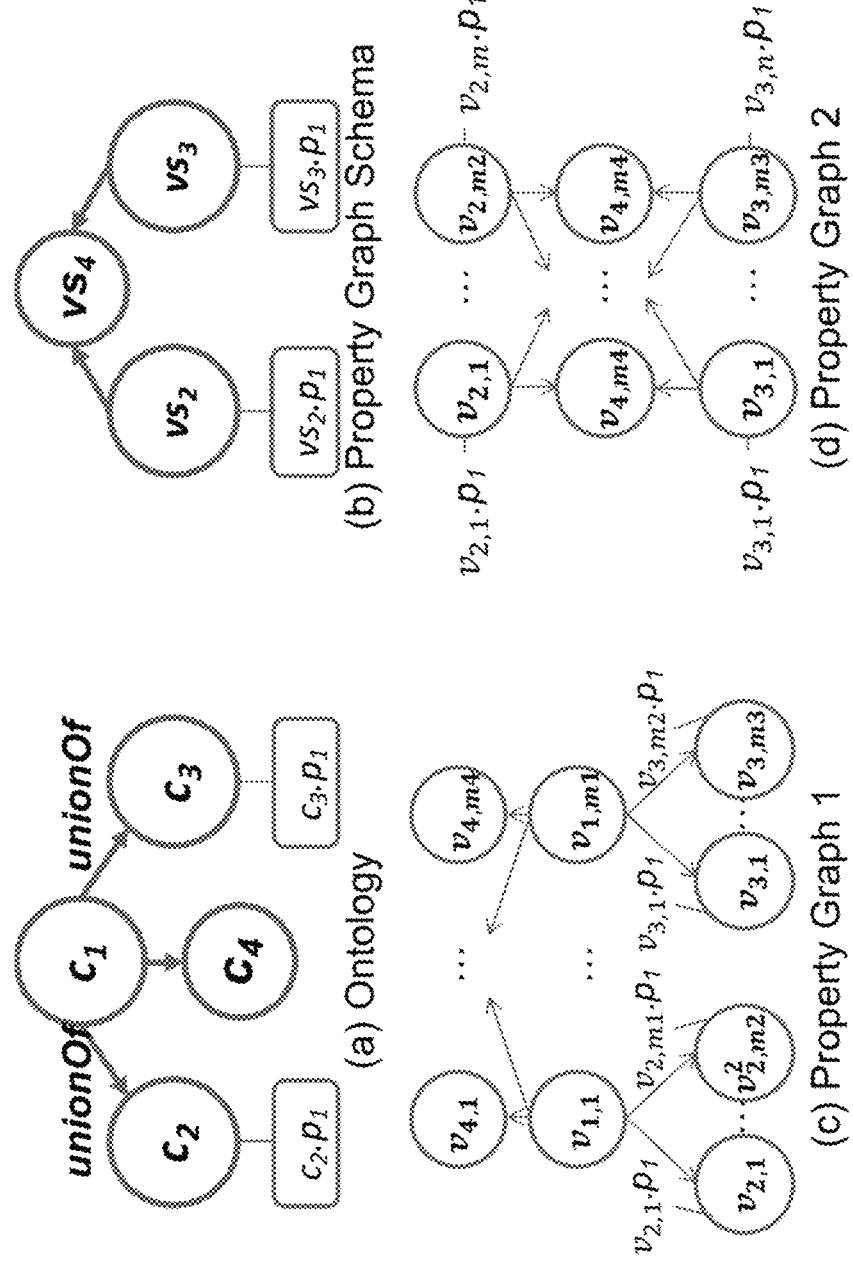
FIG. 3 depicts an example scenario of optimizing union relationships in a property graph schema according to one or more embodiments of the present invention.

FIG. 3 depicts an example scenario of optimizing union relationships in a property graph according to one or more embodiments of the present invention. A union relationship ($r_{UN}=(c_i, c_j)$) contains a union concept ($c_i$) and a member concept ($c_j$). Each instance of a union concept is an instance of one of its member concepts and each instance of a member concept is also an instance of the union concept. FIG. 3, ontology (a) shows two member concepts ($c_2$ and $c_3$) of a union concept ($c_1$). A graph query 120 accessing an instance of $c_1$ is equivalent to accessing the instances of either $c_2$, or $c_3$, or both. In other words, if a property graph schema (b) is directly created from the ontology (a) as shown in FIG. 3, then all member instance vertices such as $v_{2,1}$ have to traverse through a certain instance vertex of $vs_1$ (i.e., $v_{1,1}$) in order to access $v_{4,1}$ in the property graph (c). This leads to unnecessary edge traversal and space overheads. Accordingly, when creating the property graph schema, the optimizer 113 uses a union rule to remove the union concept $c_1$, and to connect the member concepts $c_2$ and $c_3$ directly to all concepts that are connected to $c_1$.

Figure 4:
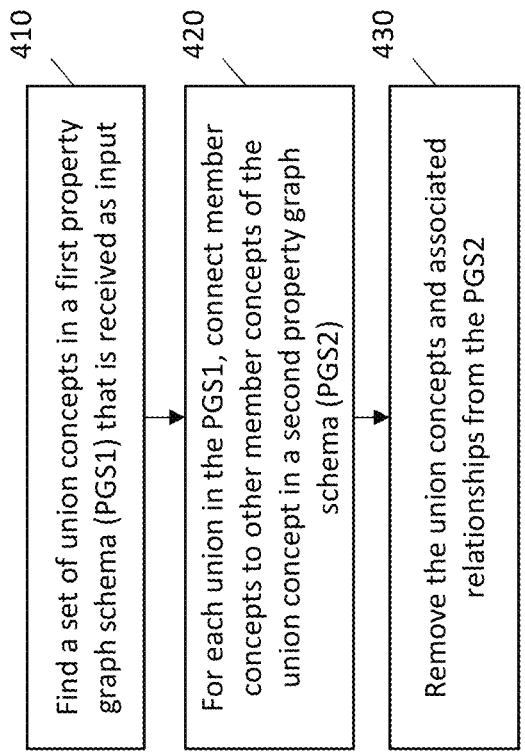
FIG. 4 depicts a flowchart of a method for optimizing unions in a property graph schema according to one or more embodiments of the invention.

FIG. 4 depicts a flowchart of a method for optimizing unions in a property graph schema according to one or more embodiments of the invention. The optimizer 113 takes as input a first property graph schema 116, the ontology 113 and a set of union relationships $R_{union}$ to and outputs a second property graph schema 116 that does not include the union relationships. The second property graph schema 116 is an optimized version of the first property graph schema 116. The method 400 that is depicted by the flowchart in FIG. 4 is also described by the algorithm in table 2.

The method 400 includes finding all union concepts from the given set of union relationships in the first property graph schema 116, at block 410 (Line 1). For each union concept, the optimizer 114 connects all the member concepts to the other concepts that connect to the union concept, at block 420 (Lines 3-6). Further, the union concepts and their associated relationships are removed from the second property graph schema, at block 430 (Lines 7-8). The produced property graph schema (b) and the corresponding property graph (d) are shown in FIG. 3, respectively. As can be seen, the number of instance vertices is reduced in the property graph (d) conforming to the schema (b). The additional edge traversal can be avoided using the reconfigured property graph (d).

TABLE 2

Figure 5:
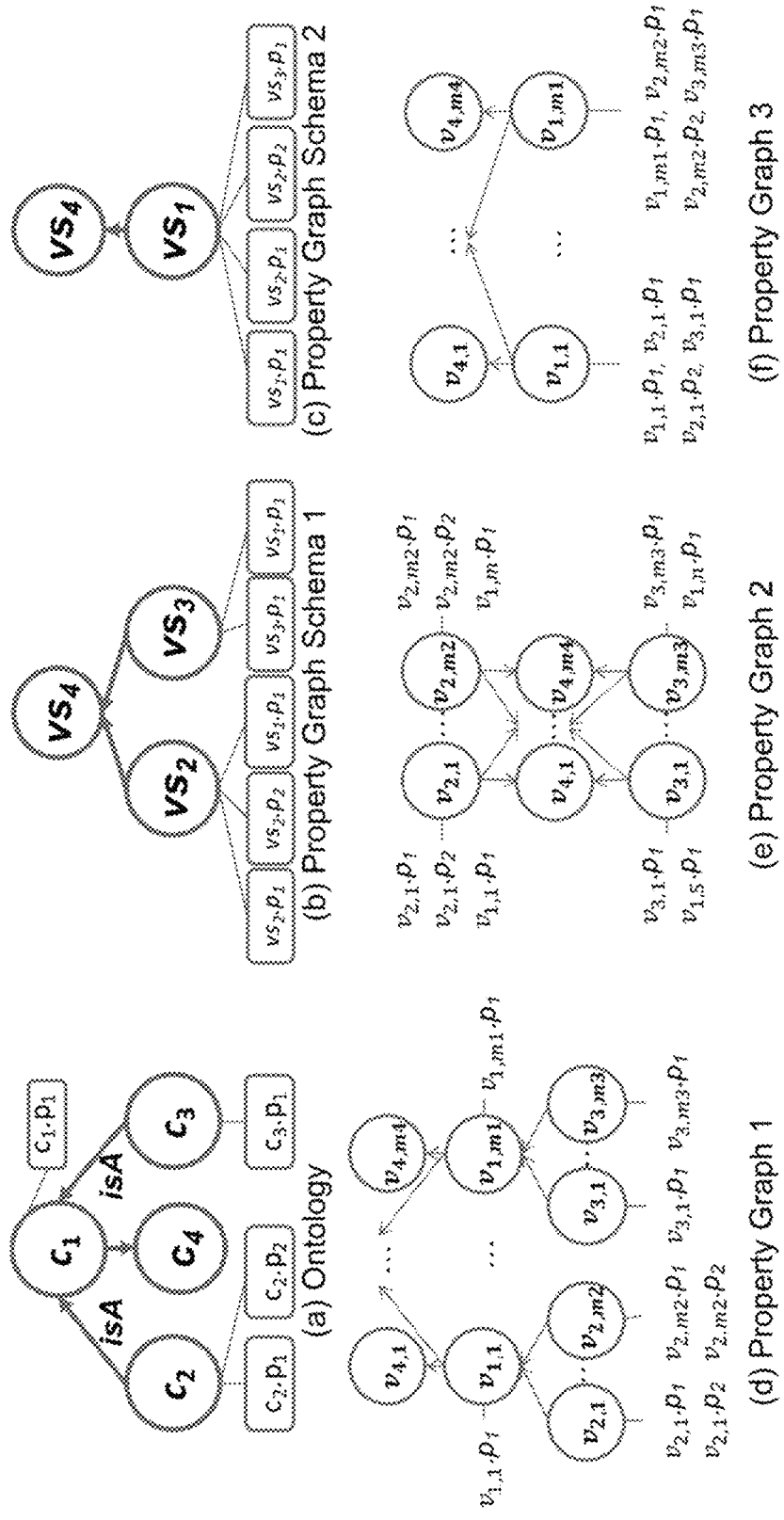
FIG. 5 depicts example scenario of optimizing inheritance relationships in a property graph schema according to one or more embodiments of the present invention.

Input: $O = (C, R, P)$, a set of union relationships $R_{union}$
Output: $O = (C, R, P)$
1:    $C_{union} \leftarrow src(R_{union})$  // all union concepts of $R_{union}$
2:    for each $c \in C_{union}$ do
3:    |  for each $c,r \in R_{union}$ do
4:    |  |  $c_{memb} \leftarrow c.r.dst$  // the member concept
5:    |  |  $c_{memb}.outE \leftarrow c_{memb}.outE \cup (c.outE \setminus R_{union})$
6:    |  |  $c_{memb}.inE \leftarrow c_{memb}.inE \cup c.inE$
7:    $O.remove(C_{union})$
8:    $O.remove(R_{union})$
9:    return $O$ FIG. 5 depicts example scenario of optimizing inheritance relationships in a property graph schema according to one or more embodiments of the present invention. The inheritance relationship ($r_{IH}=(c_i, c_j)$) contains a parent concept ($c_i$) and a child concept ($c_j$). Unlike a union concept, a parent concept in the inheritance relationship can have instances that are not present in any of its child concepts (see (a) in FIG. 5). This characteristic leads to two different scenarios for reducing graph traversals, as illustrated in the cases (b) and (c) of FIG. 5. Specifically, we can either remove the parent concept ($c_i$) and then attach its data properties $c_i.P_i$ to its child concept $c_1$, or remove the child concept ($c_j$) and then attach the data properties $c_j.P_j$ to its parent concept $c_i$. In both cases, edge traversal can be avoided and the number of instance vertices is reduced in the property graph conforming to the optimized property graph schema.

Here, attaching the data properties ($c_i.P_i$) from the parent concept to the child concept incurs data replication as $c_i.P_i$ is shared among all children concepts. If the number of data properties shared by the child concepts is large, the data replication can introduce a significant amount of space overhead, as depicted in the case (b) in FIG. 5. On the other hand, when the data properties ($c_j.P_j$) from the child concepts are replicated to their parent concept ($c_i$), $c_i$ may have a large number of data properties. However, these data properties may not exist in each instance vertex of $c_i$. Consequently, the instance vertices of $c_i$ consume unnecessary space. To avoid the above two issues, embodiments of the present invention facilitate using the Jaccard similarity between $c_i.P_i$ and $c_j.P_j$ to decide the most appropriate strategy for the inheritance relationship. The Jaccard similarity can be determined as:

$$JS(c_i.P_i, c_j.P_j) = |c_i.P_i \cap c_j.P_j| / |c_i.P_i \cup c_j.P_j| \quad (1)$$

Figure 6:
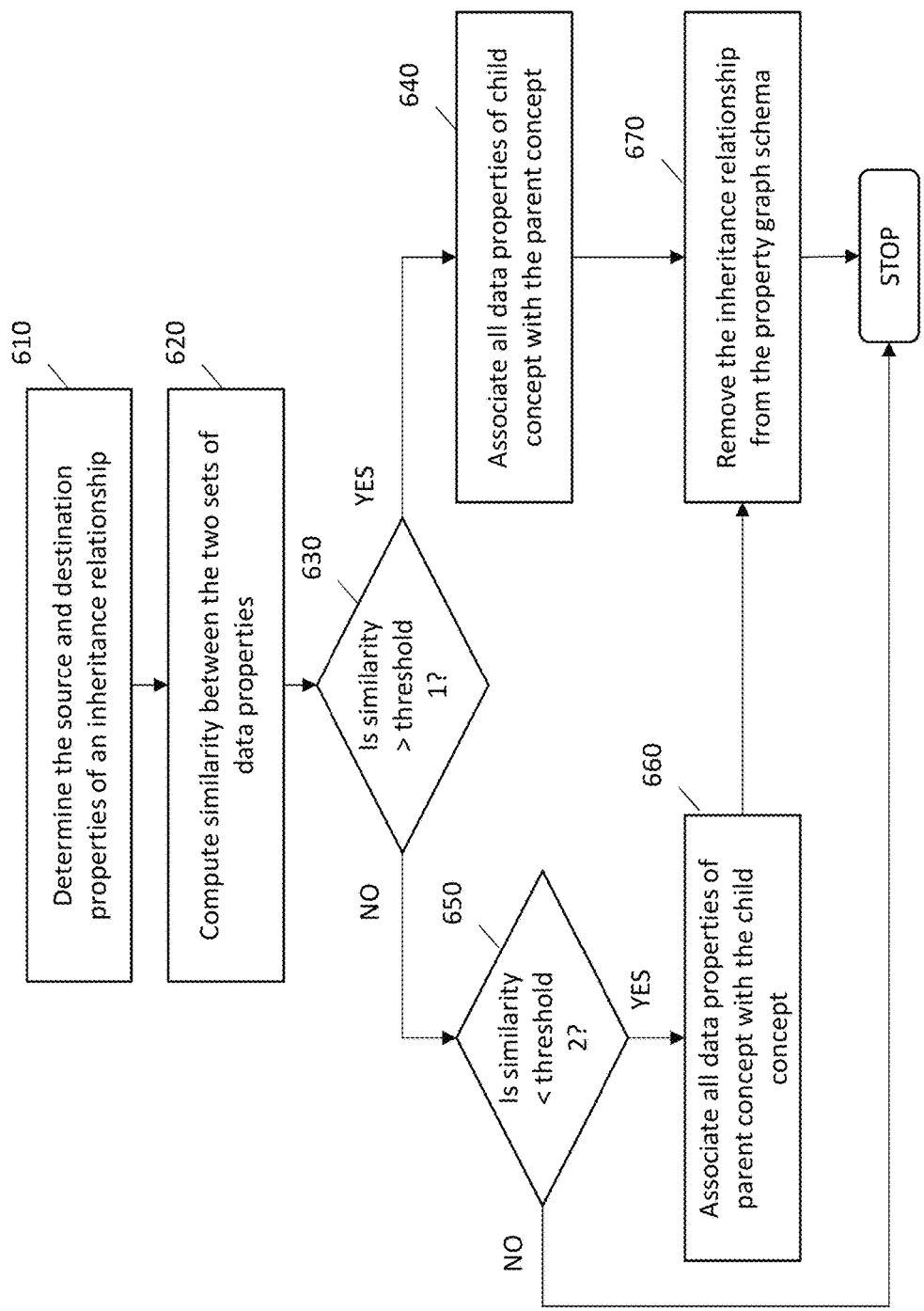
FIG. 6 depicts a flowchart of a method for optimizing inheritance relationships in a property graph schema according to one or more embodiments of the invention.

FIG. 6 depicts a flowchart of a method for optimizing inheritance relationships in a property graph according to one or more embodiments of the invention. The method 600 includes receiving an inheritance relationship $r_{inheritance}$, and the ontology $O (C, R, P)$ 113 that is used to generate the optimized property graph schema 116. The optimizer 114, by executing the method 600, outputs the second property graph schema 116 that does not include the inheritance relationship. The second property graph schema 116 is an optimized version of the first property graph schema 116.

The method 600 that is depicted by the flowchart in FIG. 6 is also described by the algorithm in table 3.

The method 600 includes determining the DataProperties of the source and destination concepts associated with the inheritance relationship, at block 610 (Lines 1, 2). Further, a similarity between the DataProperties is computed, at block 620. In one or more embodiments of the present invention, the similarity is computed as the Jaccardian similarity as described herein (line 3). It should be noted that the similarity score of a pair of parent and child concepts remains unchanged even if new data properties are added to one or both concepts as a result of applying other rules. The reason is that the Jaccard similarity is computed based on the given ontology, as it represents the semantic similarity between two concepts with an inheritance relationship. The newly added data properties are only meaningful to the property graph schema but not to the ontology. Hence, the Jaccard similarity score is computed for all inheritance relationships before applying the steps of the method 600 in one or more embodiments of the present invention.

TABLE 3

Input: $O$ = (C, R, P), an inheritance relationship $r_{inheritance}$
Output: $O$ = (C, R, P)
1:     $P_1 \leftarrow r_{inheritance}.src.P$
2:     $P_2 \leftarrow r_{inheritance}.dst.P$
3:     $J \leftarrow r_{inheritance}.js$    // get Jaccard similarity of $r_{inheritance}$
4:     if $J > \theta_1$ then
5:     |    for each $p \in P_2$ do
6:     |    |    $r_{inheritance}.src.P.add(p)$
7:     else if $J < \theta_2$ then
8:     |    for each $p \in P_1$ do
9:     |    |    $r_{inheritance}.dst.P.add(p)$
10:    $O.remove(r_{inheritance})$
11:    return $O$ The computed similarity score is compared with a first predetermined threshold, $\theta_1$, at block 630 (line 4). If the similarity score is greater than the first threshold, it indicates that the child concept $c_j$ shares a majority of data properties with its parent concept $c_i$. In other words, the child concept has only (at a maximum) a predetermined number of properties in addition to the ones of the parent concept. It should be noted that the inheritance relationship between $c_i$ and $c_j$ entails that $c_i.P_i \subseteq c_j.P_j$. In this case, moving $cj.P_j$ from the child concept to $c_i$ and then removing $c_1$ incurs less space overhead compared to the other way. Accordingly, all data properties of the child concept are associated with the parent concept, at block 640 (lines 5, 6).

Instead, if the similarity score is less than a second predetermined threshold, $\theta_2$, at block 650 (line 7), all the data properties of the parent concept are associated with the child concept, at block 660. Here, $\theta_2 \leq \theta_1$. Satisfying this condition is indicative that the child concept has at least a minimum predetermined number of DataProperties that are different from those of the parent concept. Therefore, it is more cost effective to make the data properties of the parent concept available at the child concept. In either case, the method 600 reduces the number of instance vertices and avoids edge traversals in the resulting property graph. The inheritance relationship is removed from the property graph schema in both cases, at block 670. If $\theta_2 <$ similarity score $< \theta_1$, then the inheritance relationship is not optimized in this manner. In the case, the process terminates without making any changes to the parent and the child concepts, and without removing the inheritance relationship between them.

Figure 7:
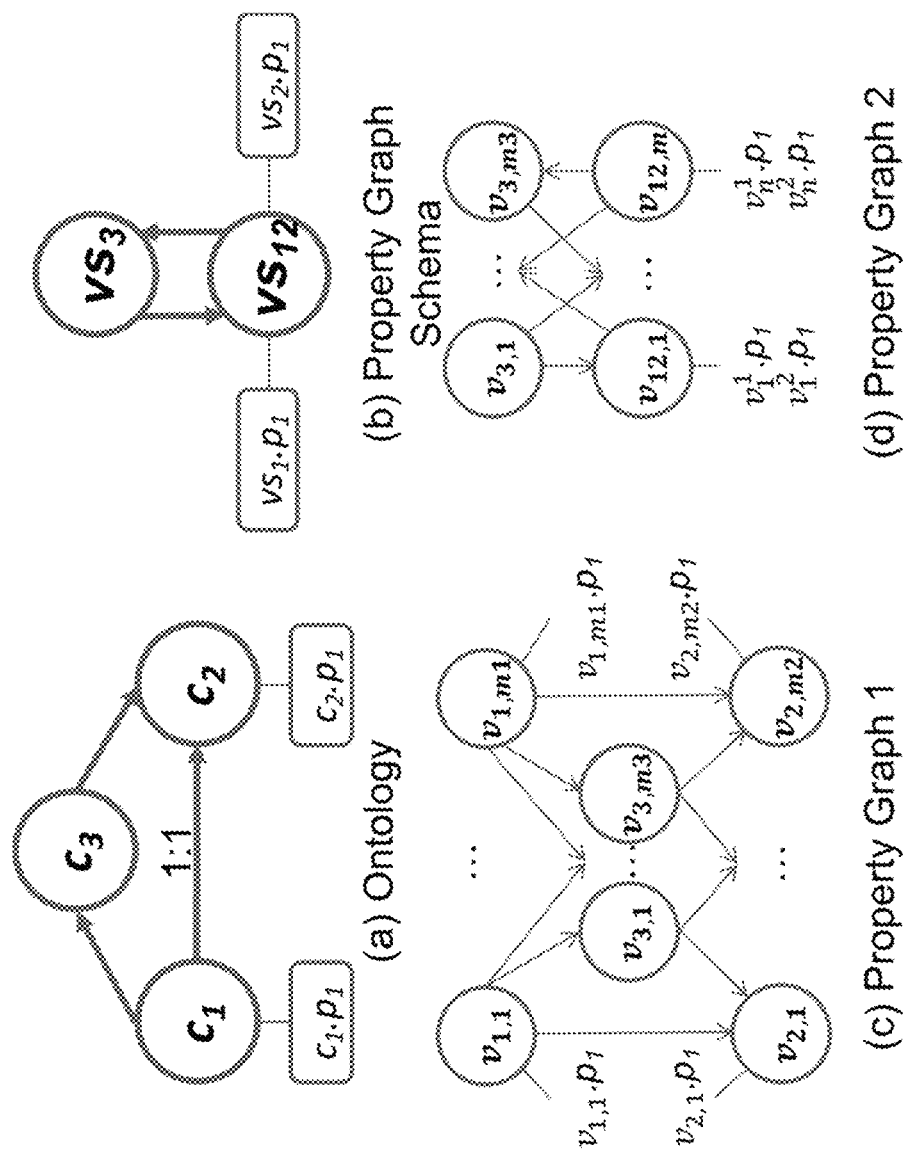
FIG. 7 depicts an example scenario optimizing one-to-one (1:1) relationships in a property graph schema according to one or more embodiments of the present invention.

FIG. 7 depicts an example scenario optimizing one-to-one (1:1) relationships in a property graph schema according to one or more embodiments of the present invention. The 1:1 relationship $(r_{1:1}=(c_i, c_j))$ indicates that an instance of $c_i$ can only relate to one instance of $c_1$ and vice versa, as depicted in cases (a) and (c) in FIG. 7.

Figure 8:
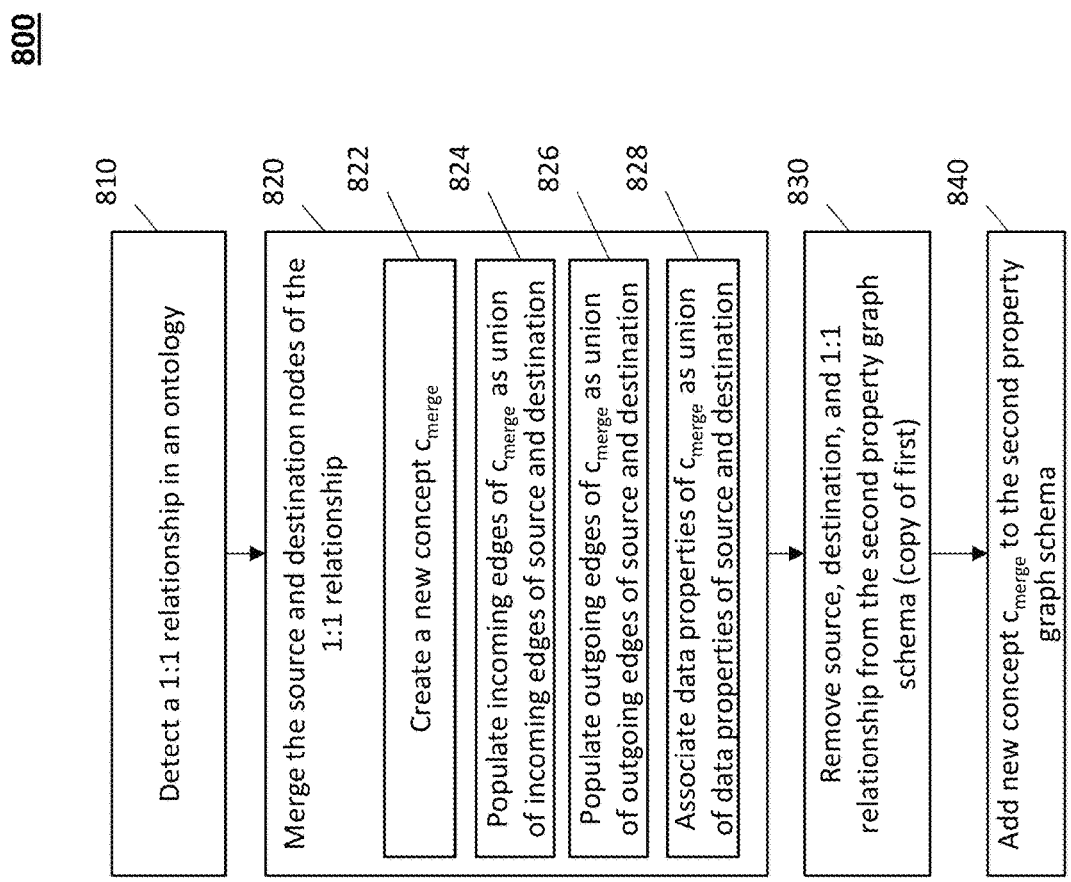
FIG. 8 depicts a flowchart of a method for optimizing 1:1 relationships in a property graph schema according to one or more embodiments of the invention.

FIG. 8 depicts a flowchart of a method for optimizing 1:1 relationships in a property graph schema according to one or more embodiments of the invention. The method 800 includes receiving and/or detecting a 1:1 relationship $r_{1:1}$ and the ontology O (C, R, P) 113 that is used to generate the optimized property graph schema 116. The optimizer 114, by executing the method 800, outputs a second property graph schema 116 that does not include the 1:1 relationship. The second property graph schema 116 is an optimized version of the first property graph schema 116. The method 800 that is depicted by the flowchart in FIG. 8 is also described by the algorithm in table 4.

The method 800 includes detecting a 1:1 relationship between concepts $c_i$ and $c_j$, at block 810. The 1:1 relationship can be removed by merging $c_i$ and $c_j$ into $c_{ij}$, at block 820. Any query accessing instance vertices of $c_i$ and $c_j$ can be satisfied by looking up the merged instance vertex of $c_{ij}$ (See cases (b) and (d) in FIG. 7). Hence, the edge traversal is avoided and the number of instance vertices (i.e., space consumption) is reduced as well.

Merging the two concepts can include, creating a new concept $c_{merge}$, at block 822 (line 1), and further populating the new concept with incoming edges and outgoing edges of both, the source and destination nodes of the 1:1 relationship, at block 824 (lines 2, 3). Further, the new concept is populated with the DataProperties of both, the source and destination nodes, at block 826 (line 4).

TABLE 4

Input: $O$ = (C, R, P), a 1:1 relationship $r_{1:1}$
Output: $O$ = (C, R, P)
1:        $c_{merge} \leftarrow null$
2:        $c_{merge}.inE \leftarrow r_{1:1}.src.inE \cup r_{1:1}.dst.inE$
3:        $c_{merge}.outE \leftarrow r_{1:1}.src.outE \cup r_{1:1}.dst.outE$
4:        $c_{merge}.P \leftarrow r_{1:1}.src.P \cup r_{1:1}.dst.P$
5:        $O.remove(r.src)$
6:        $O.remove(r.dst)$
7:        $O.remove(r)$
8:        $O.add(c_{merge})$
9:        return $O$ The source and destination nodes, along with the 1:1 relationship are removed from the property graph schema 116, at block 830. Further, the new concept that is created and populated is added to the property graph schema 116, at block 840.

Figure 9:
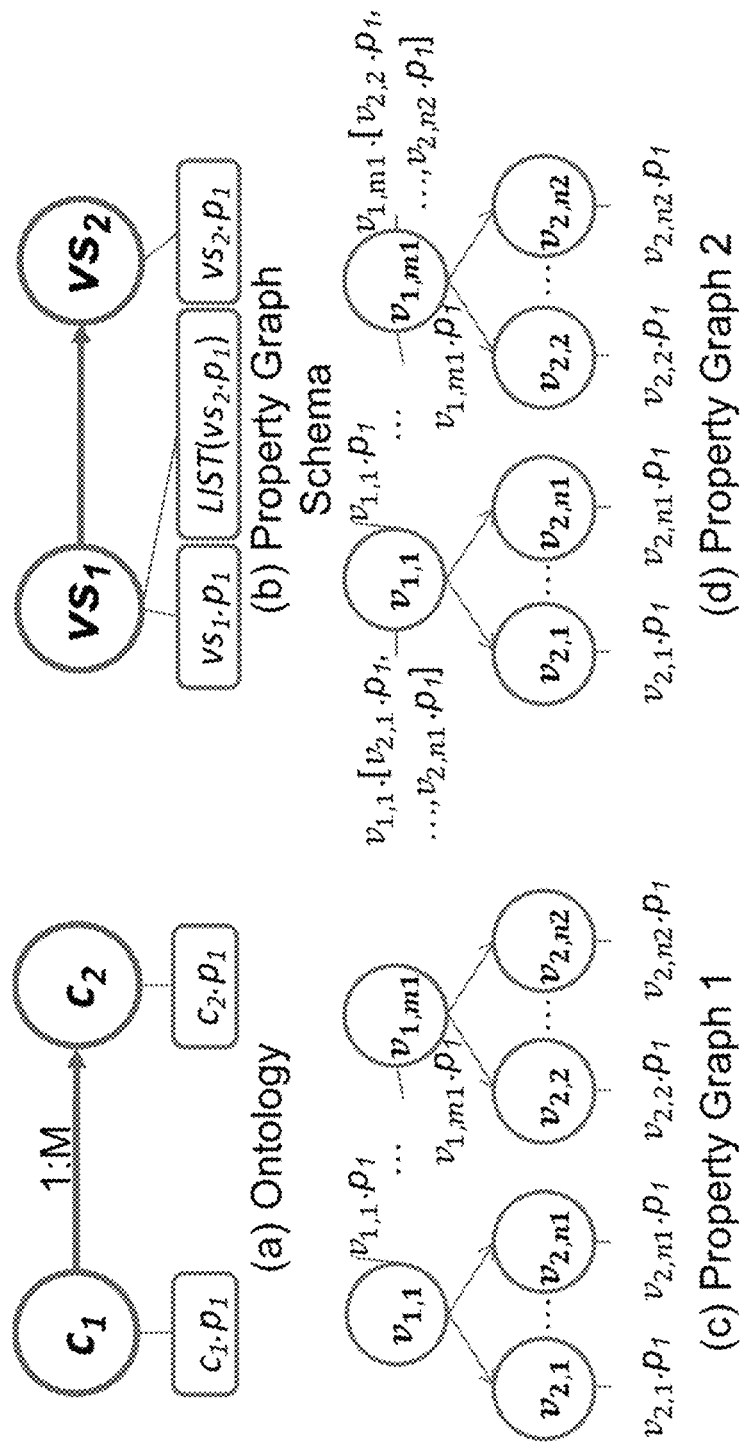
FIG. 9 depicts an example scenario optimizing one-to-many (1:M) relationships in a property graph schema according to one or more embodiments of the present invention.

FIG. 9 depicts an example scenario optimizing one-to-many (1:M) relationships in a property graph schema according to one or more embodiments of the present invention. A 1:M relationship $(r_{1:M}=(c_i, c_j))$ indicates that an instance of c, can potentially refer to several instances of $c_1$ as shown in cases (a) and (c) in FIG. 9. In other words, in a 1:M relationship, an instance of $c_i$ allows zero, one, or many corresponding instances of $c_j$. However, an instance of $c_j$ cannot have more than one corresponding instance of $c_i$.

To facilitate aggregation functions (e.g., COUNT, SUM, AVG) and neighborhood (1-hop) lookup functions in graph queries, embodiments of the present invention facilitate each data property in $c_j.P_j$ to $c_i$ as a property of type "List." Case (b) in FIG. 9 depicts an example data structure representing the type List. The aggregation and neighborhood lookup functions can directly leverage these localized list properties instead of traversing through the edges of the 1:M relationships. For example, as depicted in (d) of FIG. 9, the list of $v_{1,1} \cdot [v_{2,1} \cdot p_1, \ldots, v_{2,m2} \cdot p_1]$ at the instance vertex $v_{1,1}$ makes the aggregation queries stay at $v_{1,1}$ without going further to the other instance vertices of $vs_2$. The potential savings can be substantial when there are many edges connecting the instance vertices of $vs_1$ and $vs_2$. Table 5 provides an algorithm for optimizing the 1:M relationship in a property graph schema 116 by creating and populating a list associated with the relationship.

TABLE 5

Input: $O$ = (C, R, P), a 1:M relationship $r_{1:M}$
Output: $O$ = (C, R, P)
1:    for each p ∈ $r_{1:M}$.dst.P do
2:    |    $r_{1:M}$.src.P.addAsList(p)
3:    return O The property of type List introduces additional space overheads, which can be expensive depending on the data distribution. To address this technical problem embodiments of the present invention select the appropriate set of data properties from each 1:M relationship to propagate. Such selection facilitates improving both, query performance and space consumption.

In one or more embodiments of the present invention, the optimizer 114 also optimizes many-to-many (M:N) relationships in property graph schema. An M:N relationship $(r_{M:N}=(c_i, c_j))$ indicates that an instance of $c_i$ can have several corresponding instances of $c_j$, and vice versa. The M:N relationship can addressed as two 1:M relationships, namely, $r_{1:M}=(c_i, c_j)$ and $r_{1:M}=(c_j, c_i)$. Therefore, the many-to-many relationship is handled in an identical manner as to the above described one-to-many rule, except that the property propagation is done for both directions. Namely, a data property of $c_i$ ($c_j$) is propagated as a property of type List to $c_j$ ($c_i$), respectively. Hence, applying the many-to-many rule leads to the same potential gains for queries with aggregate functions at the cost of introducing additional space consumption.

The optimizer 114 facilitates to optimize the query performance by producing an optimized property graph schema based on the ontology 113 such that various types of graph queries can be efficiently executed over the corresponding property graph that is instantiated using the optimized property graph schema. In one or more embodiments of the present invention, the optimizer 114 utilizes the optimization techniques described herein for several different types of relationships in a sequential predetermined order and generates the optimized property graph schema 116 from an original property graph schema.

Figure 10:
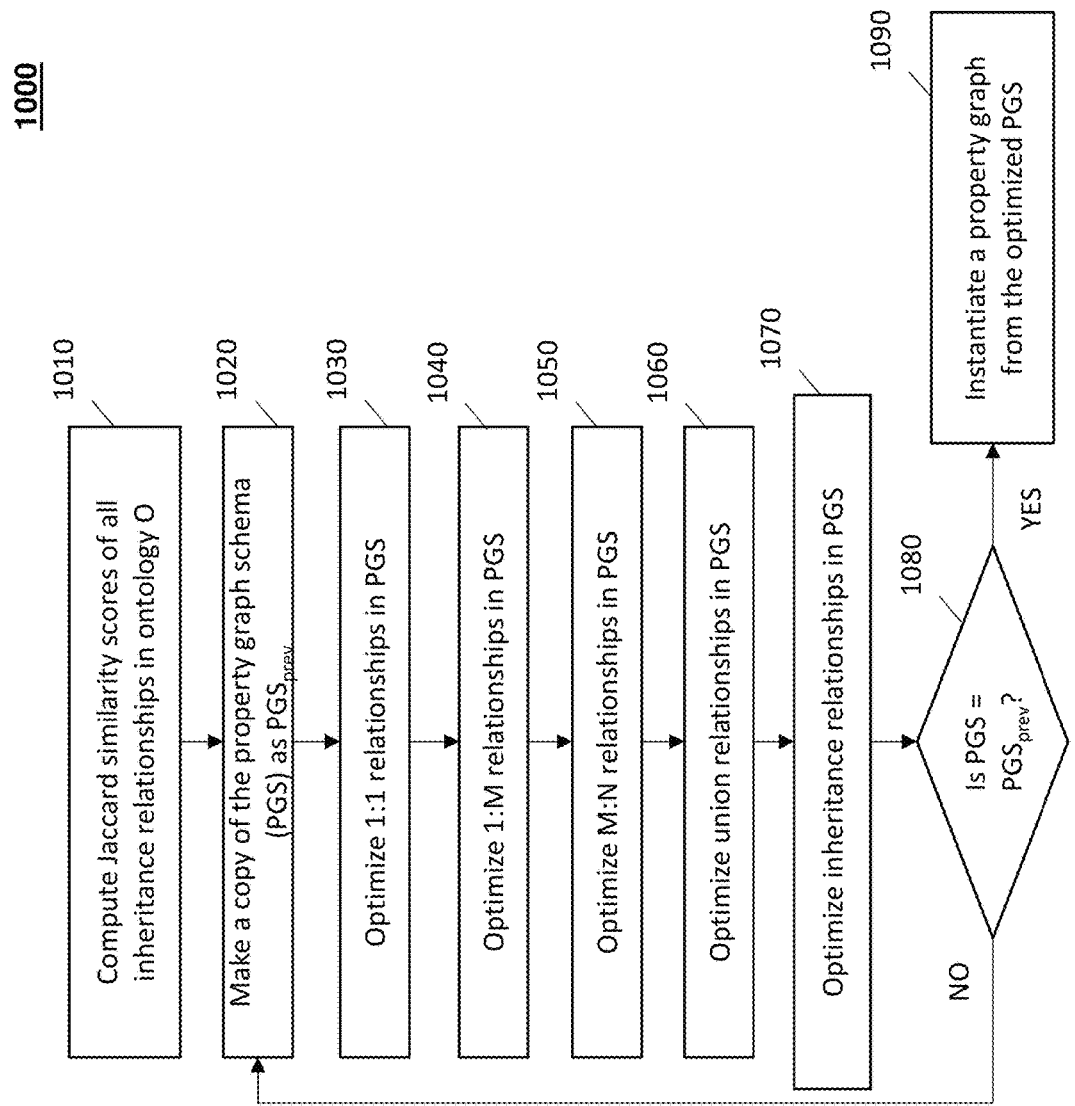
FIG. 10 depicts a flowchart of a method for optimizing query performance according to one or more embodiments of the present invention.

FIG. 10 depicts a flowchart of a method for optimizing query performance according to one or more embodiments of the present invention. The method 1000 is also provided in algorithm form in Table 6. The method 1000 uses the ontology O 113 and computes Jaccard similarity scores for all inheritance relationships in the ontology 113, at block 1010. Further, the method 1000 creates a copy of the property graph schema ($PGS_{prev}$), at block 1020. The method 1000 further includes iteratively applying the techniques for each type of relationship that is to be improved, using the Jaccard similarity scores that were initially computed. For example, the method 1000 includes optimizing the 1:1 relationships in the property graph schema 116, at block 1030. Further, the method 1000 includes optimizing the 1:M relationships in the property graph schema 116, at block 1040. Further, the M:N relationships in the property graph schema 116 are optimized, at block 1050. The union relationships are optimized by the optimizer, at block 1060. Further, the method 1000 includes optimizing the inheritance relationships in the property graph schema 116, at block 1070.

The iterations continue until the revised property graph schema that is generated by the optimizations converges, i.e., remains unchanged in two consecutive iterations, as shown at block 1080. The convergence is checked with respect to the output of the previous iteration (Line 20). The result of each iteration is stored as PGS (Lines 7, 9, 11, 14, 16, 19), over-writing the original input property graph schema. At the beginning of each iteration, $PGS_{prev}$ is assigned the output of the previous iteration (Line 5). Accordingly, at the first iteration only, PGS is the original property graph schema. Further, the method 1000 includes generating the property graph from the optimized property graph schema, at block 1090. The property graph is then used to generate the response 130 for an input query 120.

It should be noted that in one or more embodiments of the present invention, the order in which the relationships in the property graph schema 116 are optimized can be varied from the order described above. The generated property graph schema 116 is consistent regardless of the order of the optimizations.

TABLE 6

Input: $O$ = (C, R, P)
Output: $\mathcal{PGS}$ = (VS, ES, PS)
1:    // Compute Jaccard Similarity for each inheritance relationship
2:    for each r ∈ R of type inheritance do
3:    |    r.js ← computeJS(r)
4:    repeat
5:    |    $O_{prev}$ ← O
6:    |    for each r ∈ R of type 1:1 do
7:    |    |    O ← oneToOne(O, r)
8:    |    for each r ∈ R of type 1:M do
9:    |    |    O ← oneToMany(O, r)
10:    |    for each r ∈ R of type M:N do
11:    |    |    O ← manyToMany(O, r)
12:    |    for each r ∈ R of type union do
13:    |    |    $R_{union}$.add(r)
14:    |    O ← union(O, $R_{union}$)
15:    |    for each r ∈ R of type inheritance do
16:    |    |    O ← inheritance(O, r)
17:    until O = $O_{prev}$
18:    PGS ← generatePGS(O)
19:    return PGS While the method 1000 harnesses potential optimization opportunities aggressively, in some cases, it can introduce space overheads from inheritance, 1:1, and 1:M rules. For example, in cases where the number of such relationships is large in the property graph schema, this can be expensive with respect to the space consumption, especially in the cluster setting where many large-scale property graphs can co-exist.

Accordingly, in one or more embodiments of the present invention, an optimized property graph schema that corresponds to the ontology is generated, given a space limit. The technical solutions provided by embodiments of the present invention leverage additional information such as data and workload characteristics to meet the space (storage) limit.

In one or more embodiments of the present invention, data characteristics of the concepts are used to identify and prioritize the relationships when applying inheritance, one-to-many and many-to-many rules. The data characteristics contain the information about each concept, data property, and relationship specified in the ontology 113. Such information includes the cardinality of data instances of each concept and relationship, as well as the data type of each data property. The optimizer 114 uses the data characteristics to improve the efficiency of using the limited storage space that is available to the system 100.

Further, the optimizer 114 monitors and uses an access frequency, which provides how each concept, relationship, and data property is accessed by each query in the workload. As used herein, $AF(c_i.r_k.c_j.P_j)$ indicates the frequency of queries (the number of queries) that access a data property in $c_j.P_j$ from the concept $c_i$ through the relationship $r_k$. The access frequency of a relationship being higher than a predetermined threshold indicates the relationship's relative importance among all relationships in the given ontology 113. Hence, the optimizer 114 selects that relationships with at least the predetermined threshold access frequency to apply the above proposed optimization rules. The relationships that are not selected, are not applied the optimization rules, particularly the from inheritance, 1:1, and 1:M optimization rules.

It should be noted that the access frequency may not always be available, or may change over time. In case of no prior knowledge about the workload, the optimizer 114 considers that the access frequency follows a uniform distribution. Regarding changes in workloads, the optimizer 114 generates an updated property graph schema 116 corresponding to the new workload characteristics.

With data characteristics and access frequency, the optimizer 114 differentiates relationships with additional space overheads. Accordingly, the optimizer 114 can strategize for choosing the most cost effective relationships for inheritance, one-to-many, and many-to-many relationships, respectively.

Figure 11:
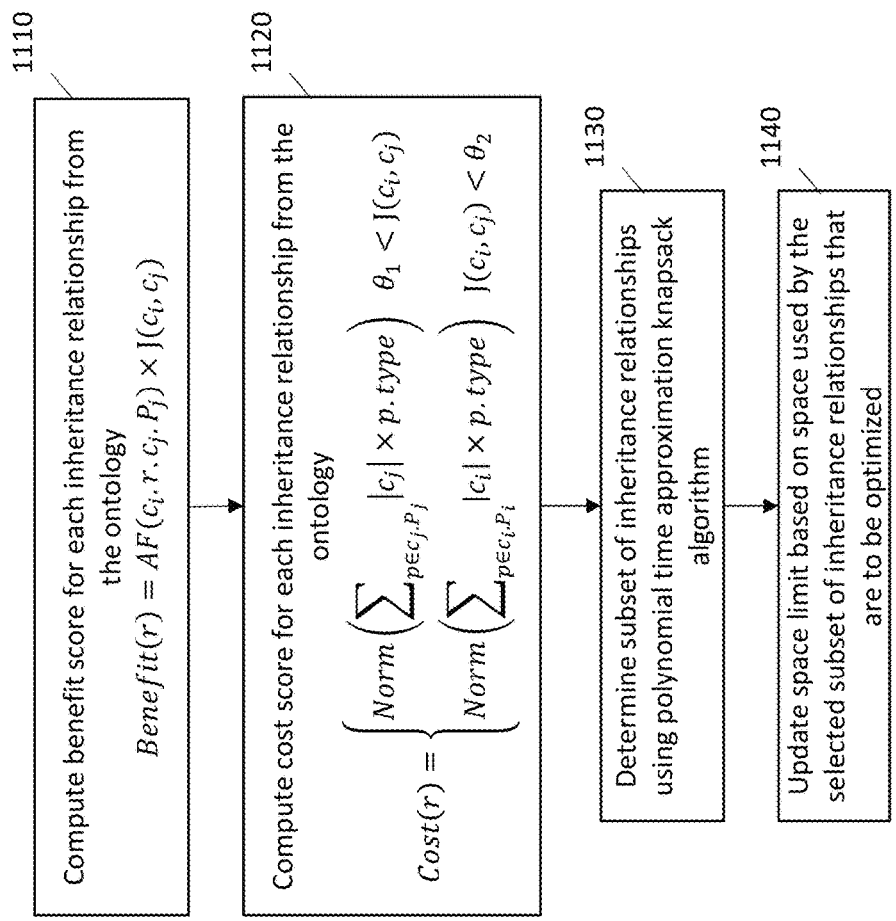
FIG. 11 depicts a flowchart for selection of inheritance relationships for optimizing according to one or more embodiments of the present invention.

FIG. 11 depicts a flowchart for selection of inheritance relationships for optimizing according to one or more embodiments of the present invention. As described before, the inheritance rule exploits the Jaccard similarity between $c_i.P_i$ and $c_j.P_j$ to decide the most appropriate strategy for the inheritance relationship. In addition to the Jaccard similarity, the optimizer 114 incorporates data characteristics and access frequency in a cost-benefit model as defined below.

$$\text{Benefit}(r) = AF(c_i \cdot r \cdot c_j \cdot P_j) \times J(c_i, c_j) \quad (2)$$

$$\text{Cost}(r) = \begin{cases} \text{Norm}\left(\sum_{p \in c_j \cdot P_j} |c_j| \times p \cdot \text{type}\right) & \theta_1 < J(c_i, c_j) \\ \text{Norm}\left(\sum_{p \in c_i \cdot P_i} |c_i| \times p \cdot \text{type}\right) & J(c_i, c_j) < \theta_2 \end{cases}$$

$AF(c_i.r.c_j.P_j)$ denotes the access frequency of $c_j.P_j$, $J(c_i, c_j)$ denotes the Jaccard similarity between $c_i.P_i$ and $c_j.P_j$, p.type denotes the data type size of p (e.g. the size of INT, DOUBLE, STRING and other such data types used by the system 100). And Norm denotes the normalize space overheads incurred by propagating $c_j.P_j$ to $c_i$ or by propagating $c_i.P_i$ to $c_j$.

With the cost and benefit scores, the optimizer 114 selects a subset of all inheritance relationships ($R_{IH}$) that maximize the total benefit within a given space limit. The optimizer 114, in one or more embodiments of the present invention, solves the relationship selection problem to the 0/1 Knapsack Problem, which is NP-hard. In one or more examples, the optimizer 114 adopts a polynomial time approximation scheme algorithm with bounds on optimality to produce the set of inheritance relationships with maximized benefit.

In the 0/1 Knapsack Problem, given a set of n items, with each item $x_i$ having a positive weight ($w_i$) and a positive benefit ($b_i$), and W>0, the challenge is to find a subset of items $T \subseteq 1, 2, \ldots, n$ that maximizes $\Sigma_{i \in T} b_i$, subject to $\Sigma_{i \in T} w_i \leq W$. Analogously, in the case of selecting the inheritance relationships, If both benefit and cost of a relationship are positive, then every instance of the relationship selection problem can be reduced to a valid instance of the 0/1 Knapsack problem.

Accordingly, as shown in FIG. 11 (and in table 7 in an algorithm form), the method 1100 includes computing, for each inheritance relationship, a benefit score, at block 1110. Further, a cost score is computed for each inheritance relationship, at block 1120.

TABLE 7

Input: Inheritance relationships $R_{IH}$, Space limit S
Output: Inheritance relationships $R_{IH}$
1:    Benefit$_{IH}$,Cost$_{IH}$ ← ∅
2:    for each $r_i \in R_{IH}$ do
3:    |    Benefit$_{IH}$[i] ← Benefit($r_i$)
4:    |    Cost$_{IH}$[i] ← Cost($r_i$)
5:    $R_{IH}'$ ← knapsack($R_{IH}$, $B_{IH}$, Cost$_{IH}$, S)
6:    S ← updateSpaceLimitR$_{IH}'$)    // update space limit
7:    return $R_{IH}'$ A subset of inheritance relationships ($R'_{IH}$) is determined from the set of inheritance relationships ($R_{IH}$) based on the corresponding benefit scores ($B_{IH}$), the cost scores ($C_{IH}$), and a given storage space limit (S), at block 1130. The subset is determined using the polynomial time approximation knapsack algorithm. Further, the space limit is updated according to the space consumption incurred by the subset ($R'_{IH}$), at block 1140. The selected inheritance relationships are returned in the form of the subset ($R'_{IH}$), and such selected inheritance relationships are the only ones optimized as described herein.

Figure 12:
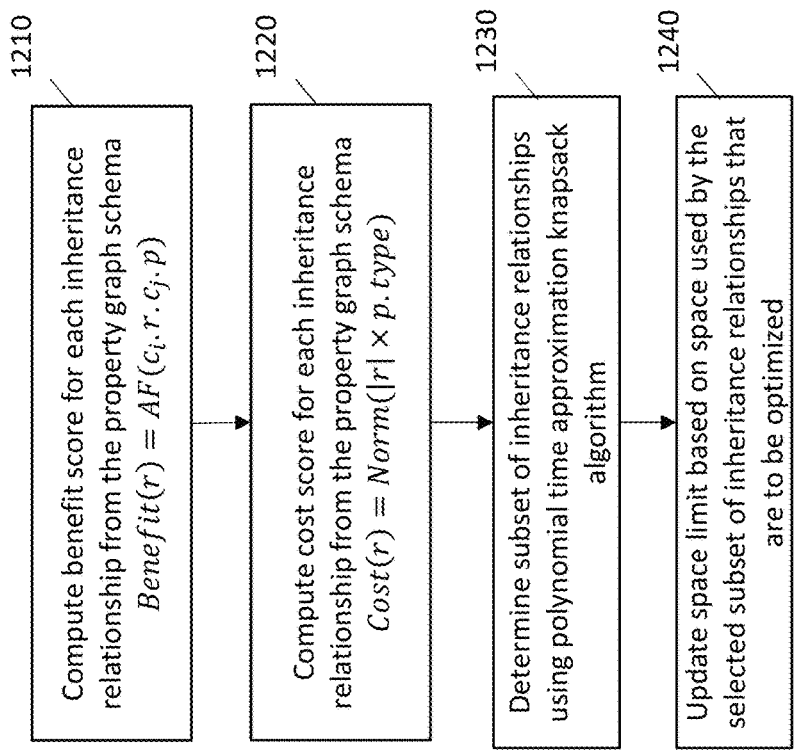
FIG. 12 depicts a flowchart for selection of 1:M relationships for optimization according to one or more embodiments of the present invention.

FIG. 12 depicts a flowchart for selection of 1:M relationships for optimization according to one or more embodiments of the present invention. The 1:M relationships that are to be optimized are also selected using data characteristics and access frequency information using a model as described below:

$$\begin{aligned} \text{Benefit}(r) &= AF(c_i \cdot r \cdot c_j \cdot p) \\ \text{Cost}(r) &= \text{Norm}(|r| \times p) \end{aligned} \quad (3)$$

Here, $AF(c_i.r.c_j.p)$ denotes the access frequency of $c_j.p$ and Norm(|r|×p.type) denotes the normalized space overhead incurred by replicating p as a data property of type List to $c_i$.

Accordingly, in method 1200, as shown in FIG. 12 (and table 8), given the space limit, the optimizer 114 first computes the cost and benefit scores for each one-to-many relationship in the property graph schema 116, at blocks 1210 and 1220. Then the optimizer 114 uses the polynomial time approximation scheme algorithm to choose a subset of one-to-many relationships with the maximum total benefit score while staying within the space limit S, at block 1230. Consequently, the space limit is updated in accordance to the newly selected one-to-many relationships, at block 1240. It should be noted that the space limit S that the optimizer 114 uses as input for selecting the 1:M relationship can be the updated value from the selection of the inheritance relationships, in one or more embodiments of the present invention.

Accordingly, the set of 1:M relationships ($R_{1:M}$) is filtered to select a subset of 1:M relationships ($R'_{1:M}$) that is to be optimized as described herein.

TABLE 8

Input: 1:M relationship $R_{1:M}$, Space limit S
Output: 1:M relationships $R_{1:M}'$
1:    $B_{1:M}$, $Cost_{1:M}$ ← 0
2:    for each $r_i \in R_{1:M}$ do
3:        $Benefit_{1:M}[i]$ ← Benefit($r_i$)
4:        $Cost_{1:M}[i]$ ← (Cost($r_i$)
5:    $R_{1:M}'$ ← knapsack($R_{1:M}$, $B_{1:M}$, $Cost_{1:M}$, S)
6:    S ← updateSpaceLimit($R_{1:M}'$) // update space limit S
7:    return $R_{1:M}'$ Further, as described herein, a many-to-many relationship is equivalent to two 1: M relationships. Accordingly, the optimizer 114 first converts each many-to-many relationship in the property graph schema 116 into two one-to-many relationships, and then uses the method 1200 to decide the subset of 1: M relationships that are to be optimized. In one or more embodiments of the present invention, some of the original many-to-many relationships can be optimized for only one direction. This increases the flexibility of applying many-to-many optimizations such that more frequently accessed data properties can be propagated to the other end of the relationship.

Using the above techniques, the optimizer 114 can select the most cost-effective relationships for each type of relationships. Embodiments of the present invention further facilitate integrating these techniques to decide a global ordering of the relationships in the property graph schema 116.

Figure 13:
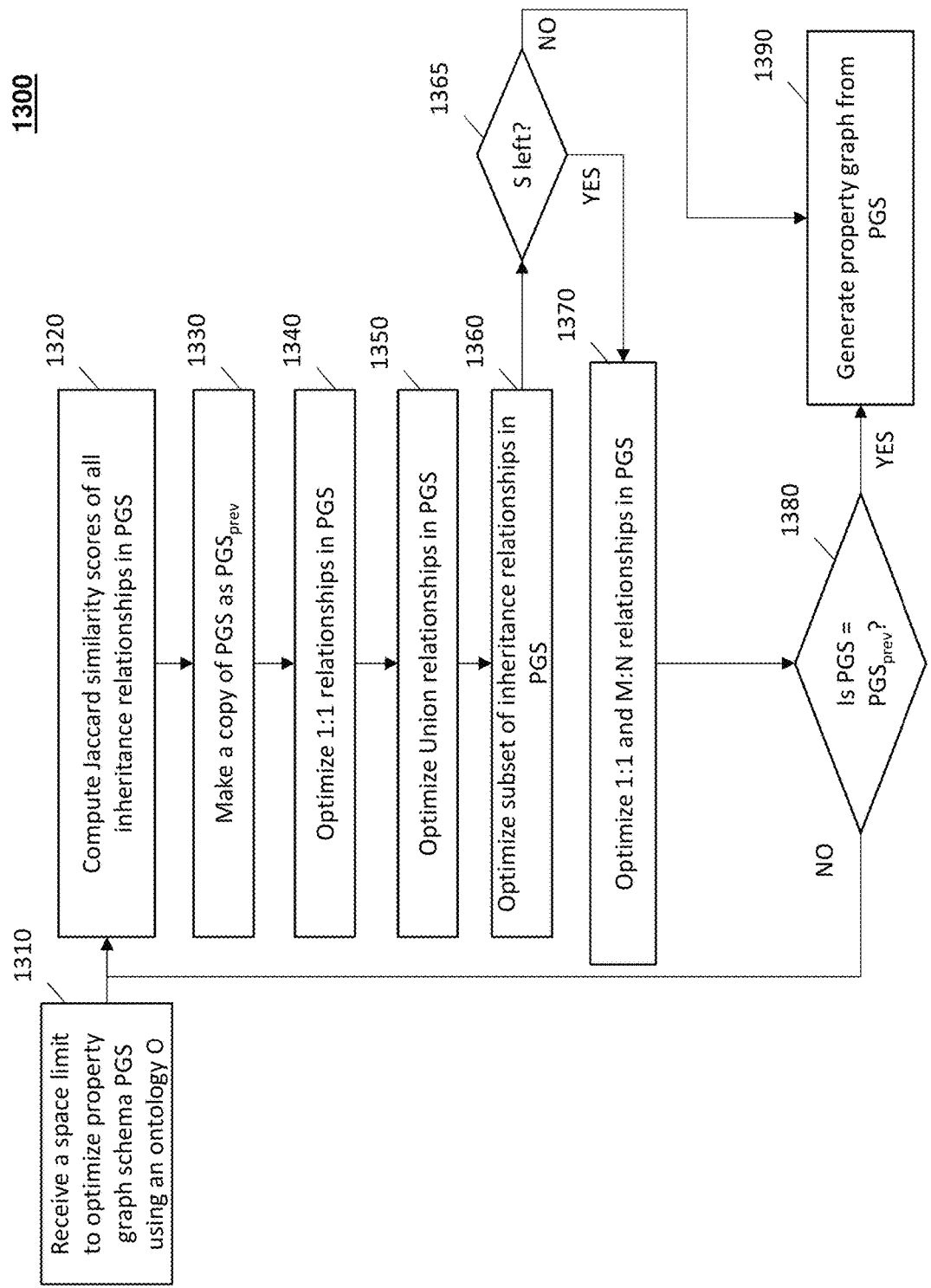
FIG. 13 depicts a flowchart of a method for a relation-centric optimization that prioritizes relationships in a property graph schema according to one or more embodiments of the present invention.

FIG. 13 depicts a flowchart of a method for a relation-centric optimization that prioritizes relationships in the ontology 113 according to one or more embodiments of the present invention. The relation-centric algorithm 1300 (tables 9-10) takes the additional input (i.e., space limit) and utilizes the optimization techniques for each type of relationship (i.e., inheritance, one-to-many, and many-to-many rules) together with one-to-one and union rules to produce the property graph schema 116. The optimizer 114 applies the optimization rules iteratively until the property graph schema 116 converges or the given space limit is fully consumed.

The method 1300 includes receiving, as input, the first property graph schema, the ontology 113, and a space limit, at block 1310. The method further includes computing the Jaccard similarity scores for all inheritance relationships in the property graph schema, at block 1320.

TABLE 9

Input: $O$ = (C, R, P), Space limit S
Output: $PGS$ = (VS, ES, PS)
1:    // Compute Jaccard similarity for each inheritance relationship
2:    for each r ∈ R of type inheritance do
3:       r.js ← computeJS(r)
4:    repeat
5:       $O_{prev}$ ← O
6:       O ← applyRules(R)
7:    until O = $O_{prev}$
8:    PGS ← generatePGS(O)
9:    return PG In each iteration, the optimizer 114 first makes an intermediate copy of the property graph schema to apply the optimization rules, at block 1330. The optimizer 114 further applies the optimization rules that do not introduce any space overheads, namely, one-to-one and union optimization rules, at blocks 1340 and 1350 (Lines 11-15).

Further, the optimizer 114 starts with inheritance relationships by selecting the ones with the maximum total benefit score for the given space limit, at block 1360 (Lines 16-20). If the space limit is not fully consumed by the inheritance optimization, at block 1365, the optimizer 114 further applies one-to-many and many-to-many rules to the rest of the relationships (Lines 21-33). i.e., the 1:M relationships and the M:N relationships, at 1370. If the space S is consumed, the optimizer 114 does not optimize the other relationships.

It should be noted that if the given space limit is completely consumed, it also leads a converged ontology since no relationship can be chosen for any optimization rules.

The method 1300 can be referred to as a "relation-centric" optimization, because the optimizer 114 gives a higher priority to inheritance relationships than one-to-many and many-to-many relationships, because compared to the latter two rules, the advantages of optimizing inheritance relationships include not only reducing edge traversal by localizing the data properties, but also reducing the number of vertices in the property graph 112.

The method 1300 includes determining if the property graph schema generated by the optimization converges with the previous property graph schema that was stored, at 1380. The optimization iterations are performed as described until the convergence is achieved. Once the convergence is achieved, or when the space constraint is met, the property graph schema is generated from the optimized property graph schema, at block 1390.

TABLE 10

10:    procedure APPLYRULES(R)
11:      for each r ∈ R of type 1:1 do
12:         O ← oneToOne(O, r)
13:      for each r ∈ R of type union do
14:         $R_{union}$.add(r)
15:      O ← union(O, $R_{union}$)
16:      for each r ∈ R of type inheritance do
17:         $R_{IH}$.add(r)
18:      $R_{IH}$ ← chooseIH($R_{IH}$, S)
19:      for each r ∈ $R_{IH}$ do
20:         O ← inheritance(O, r)
21:      for each r ∈ R of type 1:M do
22:         $R_{1:M}$.add(r)
23:      $R_{1:M}$ ← chooseOneToMany($R_{1:M}$, S)
24:      for each r ∈ $R_{1:M}$ do
25:         O ← oneToMany(O, r)
26:      for each r ∈ R of type M:N do
27:         $r_{fwd}$ ← (r.src, r.dst)
28:         $r_{rev}$ ← (r.dst, r.src)
29:         $R_{M:N}$.add($r_{fwd}$)
30:         $R_{M:N}$.add($r_{rev}$)
31:      $R_{M:N}$ ← chooseOneToMany($R_{M:N}$, S)
32:      for each r ∈ $R_{M:N}$ do
33:         O ← oneToMany(O, r)

The relation-centric optimization provides technical solutions that are capable of identifying key relationships by leveraging information such as access frequency, data characteristics, and uniqueness of each type of relationship. However, in one or more embodiments of the present invention, the domain that is addressed by the property graph may be such that not all the concepts involved are created equal. It should be noted that the ontology 113 describes a particular domain and provides a concept-centric view over domain specific data. Accordingly, in cases where certain concepts are connected to more related concepts compared to others, these concepts are queried more frequently than other concepts. Hence, to address such scenarios, in one or more embodiments of the present invention, a "concept-centric" optimization is used by the optimizer 114 to exploit the structural information in the ontology 113 to identify such "key" concepts.

One or more embodiments of the present invention determine these key concepts, using centrality analysis over the ontology 113 to rank all concepts according to their respective centrality score. The centrality analysis is based on an algorithm such as the PageRank algorithm, where the underlying assumption is that more important websites are likely to receive more links from other websites.

Figure 14:
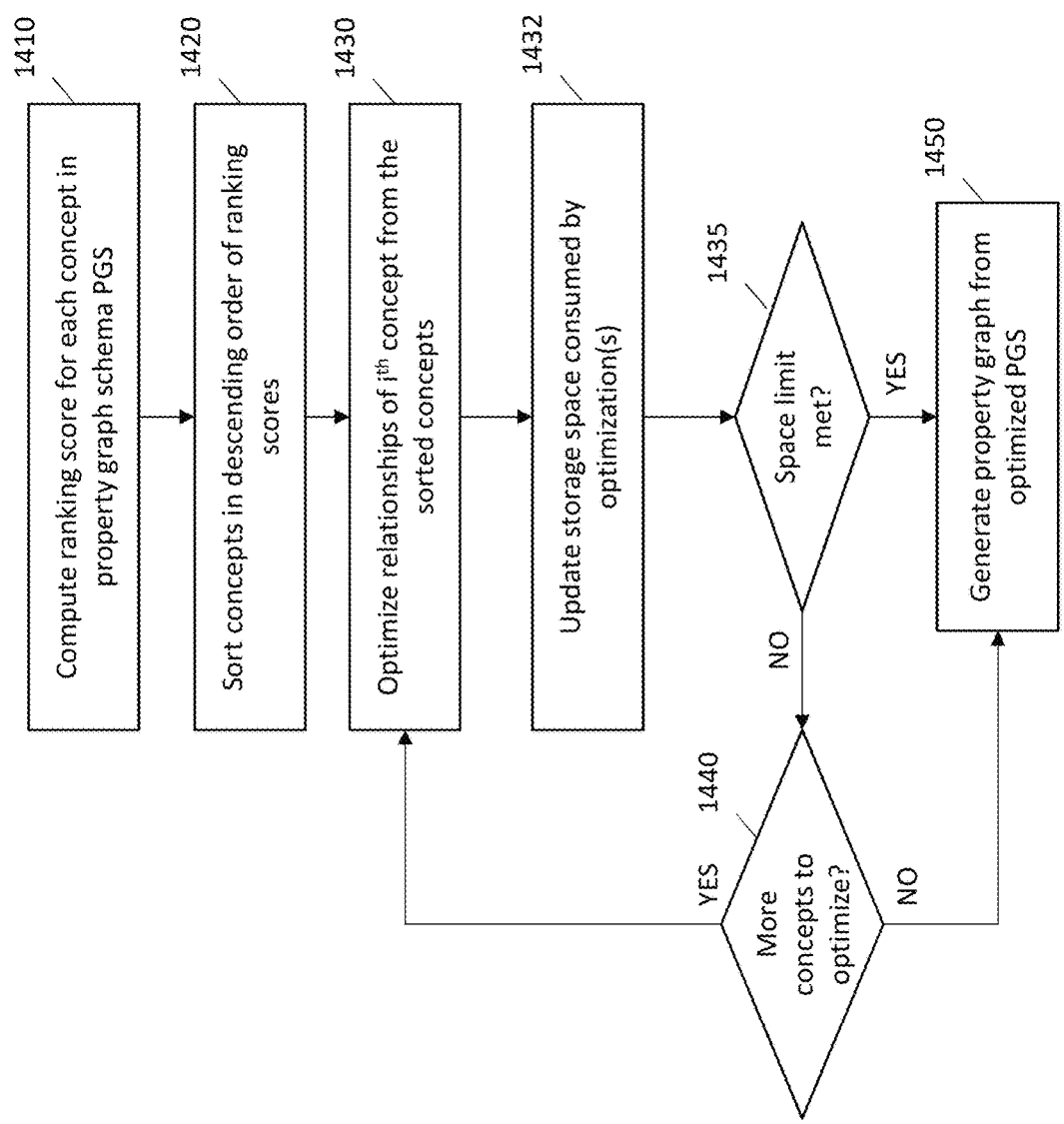
FIG. 14 depicts a flowchart of a method for optimizing a property graph schema using a concept-centric technique according to one or more embodiments of the present invention.

FIG. 14 depicts a flowchart of a method for optimizing an property graph schema using a concept-centric technique according to one or more embodiments of the present invention. Table 11 depicts the method in algorithm form as well. To implement the concept-centric algorithm, the optimizer 114 first computes the ranking scores of each concept in the ontology 113, at block 1410. The optimizer 114 uses a modified page rank algorithm, which determines the ranking score (also referred to as a centrality score) of each concept in the ontology 113. The optimizer 114 utilizes several characteristics specific to the ontology 113 such as inheritance and union that provide much richer semantics for representing real world entities. Compared to page rank, the optimizer 114 further uses weighting to both in/out degree of concepts in determining their centrality scores.

TABLE 11

Figure 15:
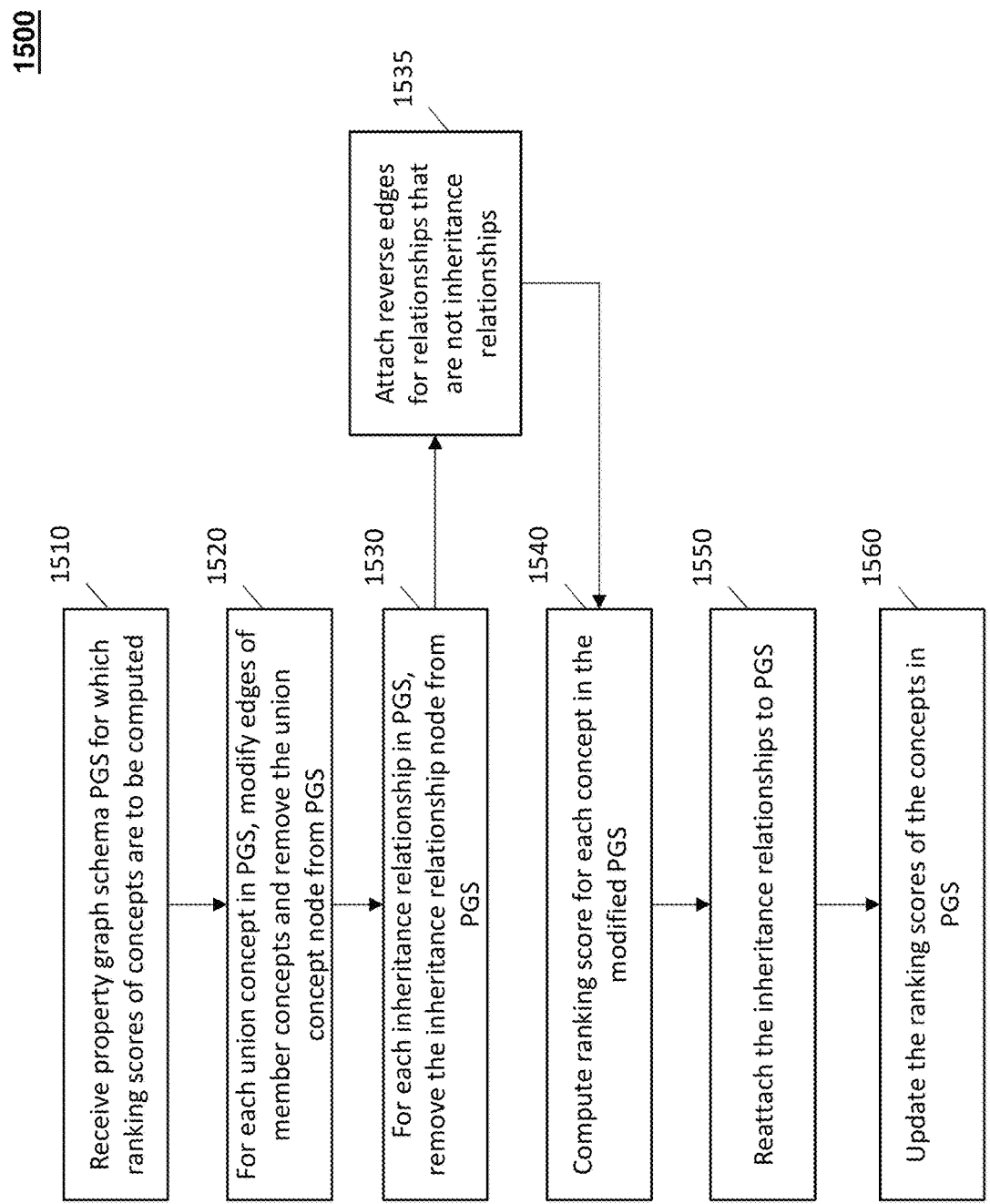
FIG. 15 depicts a flowchart of a method for computing ranking scores of concepts in a property graph schema according to one or more embodiments of the present invention.

Input: $O$ = (C, R, P), Space limit S
Output: $PG$ = (VS, ES, PS)
  1:    O ← ontologyPR(O)
  2:    $C_{srt}$ ← sort(C)  // sort C in descending order based on Eq. 4
  3:    for each c ∈ $C_{srt}$ do
  4:    |   O ← applyRules(c.R)  // the prcedure in Algorithm 8
  5:    |   if S < 0 then
  6:    |   |   break
  7:    PGS ← generatePGS(O)
  8:    return PGS FIG. 15 depicts a flowchart of a method for computing ranking scores of the concepts in the ontology 113 according to one or more embodiments of the present invention. Table 12 depicts the method in algorithm form as well. The optimizer 114 uses the method 1500 to associate ranking scores with each concept in the first property graph schema. To accurately capture the relative importance of the concepts, the optimizer 114 leverages the data characteristics and access frequency information to rank all concepts. Further, compared to the page rank algorithm, the optimizer 114 introduces weighting to both in/out degree of concepts in determining their ranking scores.

The method 1500 receives the first property graph schema where ranking scores for each of the concepts is to be computed, at block 1510.

The method further modifies the union concepts in the first property graph schema, at block 1520. The union concept in the first property graph schema represents a logical membership of two or more concepts. Any incoming edge to a union concept can therefore be considered as pointing to at least one of the member concepts of the union. Similarly each outgoing edge can be considered as emanating from at least one of the member concepts of the union.

To handle union concepts, the optimizer 114 iterates over all incoming and outgoing edges to/from the union concept. For each incoming edge to the union concept, the optimizer 114 creates new edges between the source concept and each of the member concepts of the union. For each outgoing edge, similarly, the optimizer 114 creates new edges between the destination and each of the member concepts of the union. Thus the ranking scores are appropriately distributed to/from the member nodes of the union. Finally, the union node itself is removed from the graph 112 as its contribution towards centrality analysis has already been accounted for by the new edges to/from the member concepts of the union. (lines 1-11 table 12).

Further, to cater for inheritance relationships, the optimizer 114 removes the inheritance relationships from the graph schema while executing the initial ranking algorithm, at block 1530. This allows the optimizer 114 to calculate the ranking score of a concept based on the links from other concepts that are not children of the same concept. After computing the page rank values of all concepts (1540), the optimizer 114 re-attaches these relationships (1550) and updates the ranking score of each concept by doing a depth-first traversal over its inheritance relationships to find the parent with the highest ranking score (1560).

If the value of the highest ranking score of the parent is higher than the current value of the ranking score of the concept, the concept is assigned the ranking score of the parent. This enables a child concept to inherit the ranking score value of its parent. The intuition is that a child concept inherits all its other properties from the same chain of concepts and hence is assigned a similar estimate of centrality.

It should be noted that in the standard/existing page rank algorithm, the weight distribution of the ranking score is proportional to the in-degree of a node as it receives ranking score values from all its neighbors that point to it. In other words, nodes with a high in-degree tend to have a higher ranking score than nodes with a lower in-degree. However, for a domain ontology, both in- and out-degree are equally important in terms of the key concept. Hence, the optimizer 114 introduces a reverse edge in the ontology 113, making the property graph 112 equivalent to an undirected graph, at block 1535. Then the algorithm uses this modified first property graph schema as input to get relevant ranking scores.

To accurately capture the relative importance of the concepts, the optimizer 114 further leverages the data characteristics and access frequency information to rank all concepts. The ranking score for a concept is defined as follows.

$$\text{Score}(c_i) = \frac{c_i \cdot pr \times AF(c_i)}{\text{Norm}(\text{Size}(c_i))} \qquad (4)$$

TABLE 12

Input: $O$ = (C, R, P)
Output: $O$ = (C, R, P)
  1:    $C_{union}$ ← empty set
  2:    for each r ∈ R of type union do
  3:    |   c ← r.src
  4:    |   $C_{union}$.add(c)
  5:    for each c ∈ $C_{union}$ do
  6:    |   $R_{in}$ ← c.inE  // c's incoming edges
  7:    |   $R_{out}$ ← c.outE  // c's outgoing edges
  8:    |   for each $c_{member}$ of c do // each member concept
  9:    |   |   $c_{member}$.outE ← $c_{member}$.outE ∪ c.outE
10:    |   |   $c_{member}$.inE ← $c_{member}$.inE ∪ c.inE
11:    O.remove($C_{union}$)

TABLE 12-continued

```
12:    R_inheritance ← ∅
13:    for each r ∈ R do
14:    |   if r is of type inheritance then
15:    |   |   R_inheritance.add(r)
16:    |   |   O.remove(r)
17:    |   else
18:    |   |   O.add(r')  // add a relation in the reverse direction
19:    pageRank(O)  // run PageRank on the modified graph
20:    for each r ∈ R_inheritance do
21:    |   O.add(r)  //add inheritance relationships back
22:       //update PageRank score for inheritance concepts
23:    updatePR(O)
24:    return O  // O with PageRank scores
```

Referring back to method 1400, the optimizer 114 sorts all concepts in a descending order of their respective ranking scores (Lines 1-2 table 11), at block 1420. Further, the optimizer 114 iterates through each concept c (Lines 3-6), as shown at blocks 1430 and 1440. For each concept, the optimizer 114 applies the optimization rules as described herein to process all relationships connecting to c, at block 1430. During this process, the optimizer 114 updates the space limit when it is consumed by the optimization rules, at block 1432. Once the space is fully exhausted, the method 1400 terminates (Lines 5-6) and returns the optimized property graph schema 116 (Line 7), at 1450.

Various experiments indicate that both the relationship-centric and concept-centric techniques produce property graph schema 116 under various settings and conditions that work effectively to provide accurate response to input queries, and that satisfy given space constraints.

Accordingly, technical solutions provided by embodiments of the present inventions facilitate using optimization rules for different types of relationships in a property graph schema of a domain knowledge graph using an ontology of the knowledge graph to effectively reduce edge traversals and consequently improve the graph query performance. Furthermore, such an ontology-driven approach can utilizes the given space constraint by leveraging additional information such as data distribution and workload summaries. The technical solutions facilitated by embodiments of the present invention provide improvements in the field of computing technology, particularly improving query response times using limited computer resources. As such, technical solutions facilitated by embodiments of the present invention provide practical applications of a query response system that operates using a domain knowledge graph.

Embodiments of the present invention produce a schema design applicable to any graph systems compatible with property graph model and Gremlin queries. Further, embodiments of the present invention exploit the rich semantic information in an ontology to guide the schema design. Further yet, embodiments of the present invention facilitate technical solutions that are complementary to various improvement techniques that are used by existing query response systems. For example, the ontology driven approach used by embodiments of the present invention can further leverage existing techniques to decide how the property graph should be stored on different storage back-ends. The produced graph schema can be shown to be reducing edge traversals and consequently improving the graph query performance.

Figure 16:
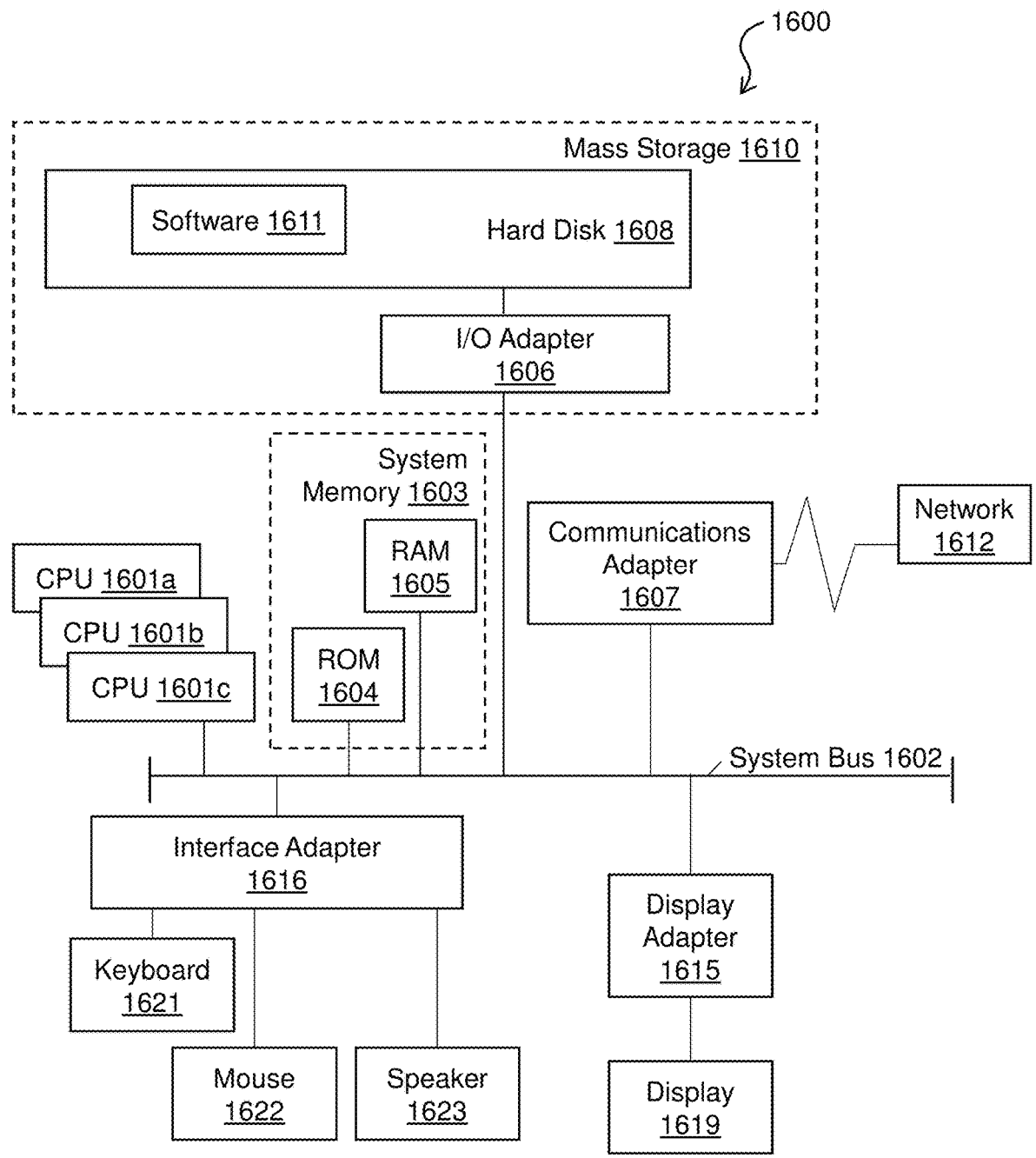
FIG. 16 depicts a computer system according to one or more embodiments of the present invention.
Figure 17:
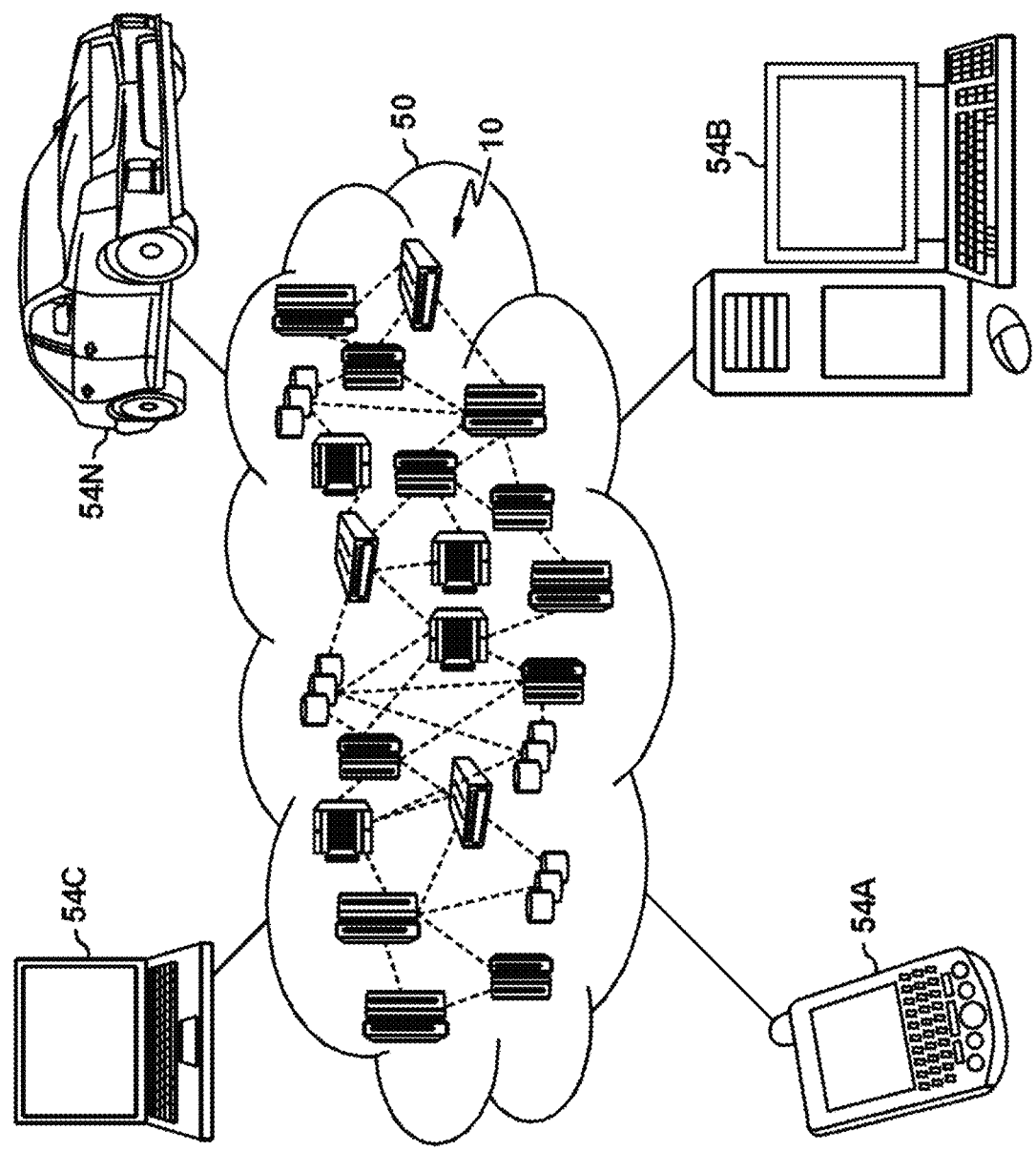
FIG. 17 depicts a cloud computing environment according to one or more embodiments of the present invention.
Figure 18:
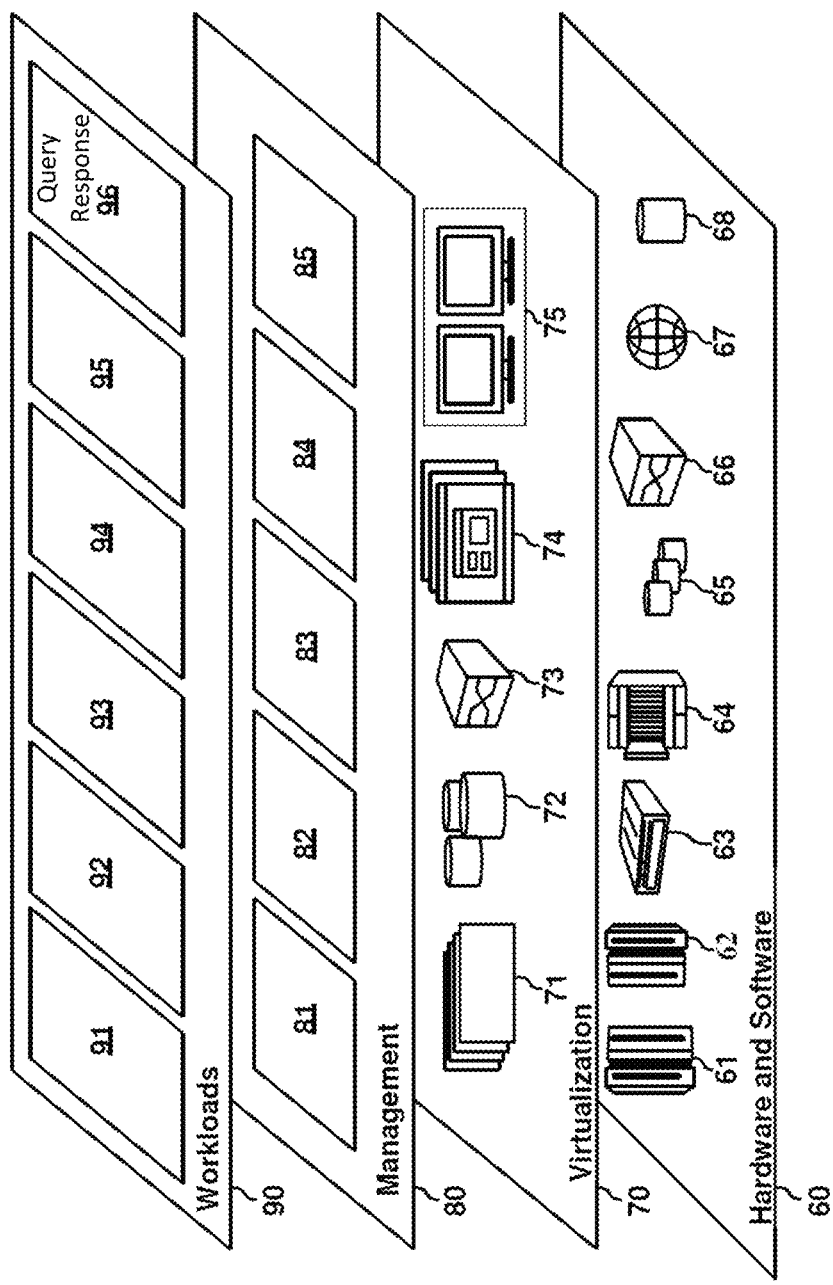
FIG. 18 depicts model layers according to one or more embodiments of the present invention.

Turning now to FIG. 16, a computer system 1600 is generally shown in accordance with an embodiment. The computer system 1600 can be an electronic, computer framework comprising and/or employing any number and combination of computing devices and networks utilizing various communication technologies, as described herein. The computer system 1600 can be easily scalable, extensible, and modular, with the ability to change to different services or reconfigure some features independently of others. The computer system 1600 may be, for example, a server, desktop computer, laptop computer, tablet computer, or smartphone. In some examples, computer system 1600 may be a cloud computing node. Computer system 1600 may be described in the general context of computer system executable instructions, such as program modules, being executed by a computer system. Generally, program modules may include routines, programs, objects, components, logic, data structures, and so on that perform particular tasks or implement particular abstract data types. Computer system 1600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, the computer system 1600 has one or more central processing units (CPU(s)) 1601a, 1601b, 1601c, etc. (collectively or generically referred to as processor(s) 1601). The processors 1601 can be a single-core processor, multi-core processor, computing cluster, or any number of other configurations. The processors 1601, also referred to as processing circuits, are coupled via a system bus 1602 to a system memory 1603 and various other components. The system memory 1603 can include a read only memory (ROM) 1604 and a random access memory (RAM) 1605. The ROM 1604 is coupled to the system bus 1602 and may include a basic input/output system (BIOS), which controls certain basic functions of the computer system 1600. The RAM is read-write memory coupled to the system bus 1602 for use by the processors 1601. The system memory 1603 provides temporary memory space for operations of said instructions during operation. The system memory 1603 can include random access memory (RAM), read only memory, flash memory, or any other suitable memory systems.

The computer system 1600 comprises an input/output (I/O) adapter 1606 and a communications adapter 1607 coupled to the system bus 1602. The I/O adapter 1606 may be a small computer system interface (SCSI) adapter that communicates with a hard disk 1608 and/or any other similar component. The I/O adapter 1606 and the hard disk 1608 are collectively referred to herein as a mass storage 1610.

Software 1611 for execution on the computer system 1600 may be stored in the mass storage 1610. The mass storage 1610 is an example of a tangible storage medium readable by the processors 1601, where the software 1611 is stored as instructions for execution by the processors 1601 to cause the computer system 1600 to operate, such as is described herein below with respect to the various Figures. Examples of computer program product and the execution of such instruction is discussed herein in more detail. The communications adapter 1607 interconnects the system bus 1602 with a network 1612, which may be an outside network, enabling the computer system 1600 to communicate with other such systems. In one embodiment, a portion of the system memory 1603 and the mass storage 1610 collectively store an operating system, which may be any appropriate operating system, such as the z/OS or AIX operating system from IBM Corporation, to coordinate the functions of the various components shown in FIG. 16.

Additional input/output devices are shown as connected to the system bus 1602 via a display adapter 1615 and an interface adapter 1616 and. In one embodiment, the adapters 1606, 1607, 1615, and 1616 may be connected to one or more I/O buses that are connected to the system bus 1602 via an intermediate bus bridge (not shown). A display 1619 (e.g., a screen or a display monitor) is connected to the system bus 1602 by a display adapter 1615, which may include a graphics controller to improve the performance of graphics intensive applications and a video controller. A keyboard 1621, a mouse 1622, a speaker 1623, etc. can be interconnected to the system bus 1602 via the interface adapter 1616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 16, the computer system 1600 includes processing capability in the form of the processors 1601, and, storage capability including the system memory 1603 and the mass storage 1610, input means such as the keyboard 1621 and the mouse 1622, and output capability including the speaker 1623 and the display 1619.

In some embodiments of the invention, the communications adapter 1607 can transmit data using any suitable interface or protocol, such as the internet small computer system interface, among others. The network 1612 may be a cellular network, a radio network, a wide area network (WAN), a local area network (LAN), or the Internet, among others. An external computing device may connect to the computer system 1600 through the network 1612. In some examples, an external computing device may be an external webserver or a cloud computing node.

It is to be understood that the block diagram of FIG. 16 is not intended to indicate that the computer system 1600 is to include all of the components shown in FIG. 16. Rather, the computer system 1600 can include any appropriate fewer or additional components not illustrated in FIG. 16 (e.g., additional memory components, embedded controllers, modules, additional network interfaces, etc.). Further, the embodiments described herein with respect to computer system 1600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the present invention can be implemented using cloud computing technology in one or more examples. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query response 96.

Further, embodiments of the present invention provide a practical application by facilitating systems to provide federated learning using anonymized data, where the data is anonymized using different syntactic algorithms at respective local sites in the federated learning system. Developing federated learning models and preserving their privacy are highly relevant in and applicable to domains such as the healthcare domain. Through experimental evaluation using at least two real-world datasets and varying parameter settings, the implementation has shown that embodiments of the present invention provide high model performance, while offering an acceptable level of privacy.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for providing a query response, the computer-implemented method comprising:
   receiving, by a computing device, a domain-specific knowledge graph;
   generating, by the computing device, a first property graph schema, a property graph schema includes vertices, edges, and properties of the domain-specific knowledge graph, wherein the first property graph schema is generated based on an ontology of the domain-specific knowledge graph;
   generating, by the computing device, a second property graph schema from a copy of the first property graph schema that is optimized by applying one or more types of relationships in the first property graph schema;
   instantiating, by the computing device, a property graph using the second property graph schema;
   receiving, by the computing device, a query to obtain particular data from the domain-specific knowledge graph; and
   responding to the query using the property graph.

2. The computer-implemented method of claim 1 further comprising, optimizing, by the computing device, the first property graph schema by modifying one or more inheritance relationships in the first property graph schema, wherein modifying an inheritance relationship comprises:
   determining a set of child data-properties of a child node of the inheritance relationship, and a set of parent data-properties of a parent node of the inheritance relationship;
   computing a similarity score for the child data-properties and the parent data-properties;
   in response to the similarity score being greater than a first threshold, associating the child data-properties with the parent node, and otherwise associating the parent data-properties with the child node; and
   removing the inheritance relationship from the first property graph schema.

3. The computer-implemented method of claim 1 further comprising, optimizing, by the computing device, the first property graph schema by modifying one or more union relationships in the first property graph schema, wherein optimizing a union relationship comprises, for a plurality of member nodes associated with the union relationship, adding an edge between each pair of member nodes from the plurality of member nodes.

4. The computer-implemented method of claim 1 further comprising, optimizing, by the computing device, the first property graph schema by modifying a 1:M relationship in the first property graph schema, the optimization comprising:
   adding, to a list of properties of a source of the 1:M relationship, all of the properties of a destination of the 1:M relationship.

5. The computer-implemented method of claim 4 further comprising, optimizing, by the computing device, the first property graph schema by modifying a M:N relationship in the first property graph schema, the optimization comprising addressing, by the computing device, the M:N relationship as multiple 1:M relationships.

6. The computer-implemented method of claim 1 further comprising, optimizing, by the computing device, the first property graph schema by modifying a 1:1 relationship in the first property graph schema, the optimization comprising:
   adding, to the second property graph schema, a new node that is generated by merging a source node and a destination node of the 1:1 relationship; and
   removing, from the second property graph schema, the source node, the destination node, and the 1:1 relationship.

7. The computer-implemented method of claim 1 further comprising, optimizing, by the computing device, the property graph schema by modifying a subset of relationships from a plurality of relationships in the first property graph schema, wherein the subset of relationships is determined based on a storage space limit.

8. The computer-implemented method of claim 7, wherein optimizing the property graph schema comprises:
   receiving the storage space limit as an input, the storage space limit indicating an amount of storage space budgeted for optimizing the property graph schema;
   determining the order of all relationships in the first property graph schema based on a cost-benefit model; and
   selecting a subset of relationships in the first property graph schema that maximize the total benefit until the storage space limit is exhausted.

9. The computer-implemented method of claim 7, wherein optimizing the property graph schema comprises:
   receiving the storage space limit as an input, the storage space limit indicating an amount of storage space budgeted for optimizing the property graph schema;
   determining the order of all concepts in the first property graph schema based on the centrality analysis; and
   iterating through the concepts from high centrality score to lower and apply relationship rules to each concept until the storage space limit is exhausted.

10. A system comprising:
    a memory; and
    a processor coupled with the memory, the processor configured to perform a computer-implemented method for providing a query response, the computer-implemented method comprising:
      receiving a domain-specific knowledge graph;
      generating a first property graph schema, property graph schema includes vertices, edges, and properties of the domain-specific knowledge graph, wherein the first property graph schema is generated based on an ontology of the domain-specific knowledge graph;

generating a second property graph schema from a copy of the first property graph schema that is optimized by applying one or more types of relationships in the first property graph schema;

instantiating a property graph using the second property graph schema;

receiving a query to obtain particular data from the domain-specific knowledge graph; and responding to the query using the property graph.

11. The system of claim 10, wherein the method further comprises optimizing the first property graph schema by modifying one or more inheritance relationships in the first property graph schema, wherein modifying an inheritance relationship comprises:

determining a set of child data-properties of a child node of the inheritance relationship, and a set of parent data-properties of a parent node of the inheritance relationship;

computing a similarity score for the child data-properties and the parent data-properties;

in response to the similarity score being greater than a first threshold, associating the child data-properties with the parent node, and otherwise associating the parent data-properties with the child node; and removing the inheritance relationship from the first property graph schema.

12. The system of claim 10, wherein the method further comprises optimizing the first property graph schema by modifying one or more union relationships in the first property graph schema, wherein the optimizing a union relationship comprises, for a plurality of member nodes associated with the union relationship, adding an edge between each pair of member nodes from the plurality of member nodes.

13. The system of claim 10, wherein the method further comprises optimizing, by the computing device, the first property graph schema by modifying a 1:M relationship in the first property graph schema, the optimization comprising:

adding, to a list of properties of a source of the 1:M relationship, all of the properties of a destination of the 1:M relationship.

14. The system of claim 10, wherein the method further comprises optimizing, by the computing device, the first property graph schema by modifying a M:N relationship in the first property graph schema, the optimization comprising addressing the M:N relationship as multiple 1:M relationships, wherein optimizing a 1:M relationship in the ontology comprises:

adding, to a list of properties of a source of the 1:M relationship, all of the properties of a destination of the 1:M relationship.

15. The system of claim 10, wherein the method further comprises optimizing the first property graph schema by modifying a 1:1 relationship in the first property graph schema, the optimization comprising:

adding, to the second property graph schema, a new node that is generated by merging a source node and a destination node of the 1:1 relationship; and removing, from the second property graph schema, the source node, the destination node, and the 1:1 relationship.

16. The system of claim 10, wherein optimizing the property graph schema comprises:

receiving the storage space limit as an input, the storage space limit indicating an amount of storage space budgeted for optimizing the property graph schema;

determining the order of all relationships in the first property graph schema based on a cost-benefit model; and selecting a subset of relationships in the first property graph schema that maximize the total benefit until the storage space limit is exhausted.

17. The system of claim 10, wherein optimizing the property graph schema comprises:

receiving the storage space limit as an input, the storage space limit indicating an amount of storage space budgeted for optimizing the property graph schema;

determining the order of all concepts in the first property graph schema based on the centrality analysis; and iterating through the concepts from high centrality score to lower and apply relationship rules to each concept until the storage space limit is exhausted.

18. A computer program product comprising a memory storage device having computer executable instructions stored thereon, the computer executable instructions when executed by a processing unit cause the processing unit to perform a method comprising:

receiving a domain-specific knowledge graph;

generating a first property graph schema, a property graph schema includes vertices, edges, and properties of the domain-specific knowledge graph, wherein the first property graph schema is generated based on an ontology of the domain-specific knowledge graph;

generating a second property graph schema from a copy of the first property graph schema that is by applying one or more types of relationships in the first property graph schema;

instantiating a property graph using the second property graph schema;

receiving a query to obtain particular data from the domain-specific knowledge graph; and responding to the query using the property graph.

19. The computer program product of claim 18, wherein the method further comprises, optimizing the first property graph schema by modifying one or more inheritance relationships in the first property graph schema, wherein modifying an inheritance relationship in the ontology comprises:

determining a set of child data-properties of a child node of the inheritance relationship, and a set of parent data-properties of a parent node of the inheritance relationship;

computing a similarity score for the child data-properties and the parent data-properties;

in response to the similarity score being greater than a first threshold, associating the child data-properties with the parent node, and otherwise associating the parent data-properties with the child node; and removing the inheritance relationship from the first property graph schema.

20. The computer program product of claim 18, wherein the method further comprises, optimizing the first property graph schema by modifying one or more union relationships, wherein the optimizing a union relationship comprises, for a plurality of member nodes associated with the union relationship, adding an edge between each pair of member nodes from the plurality of member nodes.

21. The computer program product of claim 18, wherein the method further comprises, optimizing the first property graph schema by modifying a 1:1 relationship in the first property graph schema, the optimization comprising:
- adding, to the second property graph schema, a new node that is generated by merging a source node and a destination node of the 1:1 relationship; and
- removing, from the second property graph schema, the source node, the destination node, and the 1:1 relationship.

22. The computer program product of claim 21, wherein the method further comprises, optimizing, by the computing device, the first property graph schema by modifying a 1:M relationship in the first property graph schema by addressing the M:N relationship as multiple 1:M relationships, wherein optimizing a 1:M relationship comprises:
- adding, to a list of properties of a source of the 1:M relationship, all of the properties of a destination of the 1:M relationship.

23. A computer-implemented method for providing a query response, the computer-implemented method comprising:
- receiving, by a computing device, a domain-specific knowledge graph;
- generating, by the computing device, a first property graph schema, a property graph schema includes vertices, edges, and properties of the domain-specific knowledge graph, wherein the first property graph schema is generated based on an ontology of the domain-specific knowledge graph; and
- generating, by the computing device, a second property graph schema, which is a replica of the first property graph schema, and optimizing the second property graph schema by applying one or more types of relationships in the first property graph schema, wherein optimizing the second property graph schema comprises:
  - receiving a storage space limit as an input, the storage space limit indicating an amount of storage space budgeted for optimizing the second property graph schema;
  - determining the order of all relationships in the first property graph schema based on a cost-benefit model; and
  - selecting a subset of relationships in the first property graph schema that maximize the total benefit until the storage space limit is exhausted.

24. A computer-implemented method for providing a query response, the computer-implemented method comprising:
- receiving, by a computing device, a domain-specific knowledge graph;
- generating, by the computing device, a first property graph schema, a property graph schema includes vertices, edges, and properties of the domain-specific knowledge graph, wherein the first property graph schema is generated based on an ontology of the domain-specific knowledge graph; and
- generating, by the computing device, a second property graph schema, which is a replica of the first property graph schema, and optimizing the second property graph schema by applying one or more types of relationships in the first property graph schema, wherein optimizing the second property graph schema comprises:
  - receiving the storage space limit as an input, the storage space limit indicating an amount of storage space budgeted for optimizing the property graph schema;
  - determining the order of all concepts in the first property graph schema based on the centrality analysis; and
  - iterating through the concepts from high centrality score to lower and apply relationship rules to each concept until the storage space limit is exhausted.

* * * * *